United States Patent
Ducrou et al.

(10) Patent No.: US 9,870,713 B1
(45) Date of Patent: Jan. 16, 2018

(54) DETECTION OF UNAUTHORIZED INFORMATION EXCHANGE BETWEEN USERS

(71) Applicant: Amazon Technologies, Inc., Reno, NV (US)

(72) Inventors: Jon Robert Ducrou, Seattle, WA (US); Brandon J. Smith, Seattle, WA (US); Kenneth O. Sanders, III, Seattle, WA (US); Marcus A. Barry, Seattle, WA (US); Christopher M. Brennan, Seattle, WA (US); David M. Lerner, Seattle, WA (US); Erik J. Miller, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 146 days.

(21) Appl. No.: 13/621,664

(22) Filed: Sep. 17, 2012

(51) Int. Cl.
G09B 7/07 (2006.01)
G09B 5/08 (2006.01)
G06Q 50/20 (2012.01)
G09B 7/12 (2006.01)

(52) U.S. Cl.
CPC ............... G09B 7/07 (2013.01); G06Q 50/20 (2013.01); G09B 5/08 (2013.01); G09B 7/12 (2013.01)

(58) Field of Classification Search
CPC .................................. G09B 7/00; G06Q 50/20
USPC ...................................................... 434/362
See application file for complete search history.

(56) References Cited

U.S. PATENT DOCUMENTS

| | | | | |
|---|---|---|---|---|
| 5,827,070 | A * | 10/1998 | Kershaw et al. | 434/322 |
| 5,947,747 | A * | 9/1999 | Walker et al. | 434/354 |
| 6,427,063 | B1 * | 7/2002 | Cook et al. | 434/350 |
| 7,930,300 | B2 * | 4/2011 | Colbran | 707/726 |
| 8,136,034 | B2 * | 3/2012 | Stanton et al. | 715/255 |
| 8,340,568 | B2 * | 12/2012 | Fadel | G09B 7/02 434/350 |
| 2002/0172931 | A1 * | 11/2002 | Greene | G09B 7/00 434/322 |
| 2003/0044760 | A1 * | 3/2003 | Banerjee | G09B 7/00 434/350 |
| 2003/0087223 | A1 * | 5/2003 | Walker | G09B 7/02 434/353 |
| 2004/0115597 | A1 * | 6/2004 | Butt | 434/156 |
| 2007/0042335 | A1 * | 2/2007 | Tidwell-Scheuring et al. | 434/350 |

(Continued)

Primary Examiner — Sam Yao
Assistant Examiner — Michael Humphrey
(74) Attorney, Agent, or Firm — Eversheds Sutherland (US) LLP

(57) ABSTRACT

Detection and prevention of unauthorized exchange of information between users of user devices is disclosed. Monitoring data associated with respective information received by the user devices from respective users may be received. Position information indicating proximity or relative positions of the devices may also be received. The monitoring data and/or the position information may be analyzed to determining whether unauthorized information exchange between users may be occurring. One or more metrics indicating a likelihood that unauthorized information exchange is occurring may be generated based on the analysis of the monitoring data and/or the position information. A generated metric may be compared to an associated threshold and preventive measures for deterring unauthorized information exchange may be identified based on a result of the comparison.

20 Claims, 9 Drawing Sheets

(56) References Cited

U.S. PATENT DOCUMENTS

| | | | |
|---|---|---|---|
| 2007/0048723 A1* | 3/2007 | Brewer et al. | 434/350 |
| 2007/0117082 A1* | 5/2007 | Winneg | G09B 7/00 |
| | | | 434/350 |
| 2007/0117083 A1* | 5/2007 | Winneg et al. | 434/350 |
| 2007/0275361 A1* | 11/2007 | Tezuka | G09B 5/04 |
| | | | 434/351 |
| 2008/0020366 A1* | 1/2008 | Okada | G09B 7/07 |
| | | | 434/322 |
| 2009/0017434 A1* | 1/2009 | Avigdor | G09B 7/06 |
| | | | 434/362 |
| 2009/0138813 A1* | 5/2009 | LaMontagne | 715/771 |
| 2009/0226872 A1* | 9/2009 | Gunther | 434/350 |
| 2010/0035220 A1* | 2/2010 | Herz et al. | 434/236 |
| 2010/0197405 A1* | 8/2010 | Douceur | A63F 13/12 |
| | | | 463/42 |
| 2011/0022940 A1* | 1/2011 | King et al. | 715/229 |
| 2011/0039249 A1* | 2/2011 | Packard et al. | 434/362 |
| 2011/0171622 A1* | 7/2011 | Lippert et al. | 434/362 |
| 2011/0207108 A1* | 8/2011 | Dorman | G09B 7/00 |
| | | | 434/350 |
| 2011/0217687 A1* | 9/2011 | Yeh et al. | 434/362 |
| 2011/0270883 A1* | 11/2011 | Bukai et al. | 707/777 |
| 2012/0042358 A1* | 2/2012 | Kondur | G06F 21/316 |
| | | | 726/3 |
| 2012/0202185 A1* | 8/2012 | Jabara et al. | 434/350 |
| 2013/0004930 A1* | 1/2013 | Sorenson et al. | 434/350 |
| 2013/0113628 A1* | 5/2013 | Shepherd | A61B 5/0476 |
| | | | 340/573.1 |
| 2013/0203037 A1* | 8/2013 | Ramaswamy | G06Q 50/20 |
| | | | 434/353 |
| 2013/0209982 A1* | 8/2013 | Rooks | G09B 7/00 |
| | | | 434/350 |
| 2014/0240507 A1* | 8/2014 | Hsu | G06Q 10/10 |
| | | | 348/159 |
| 2014/0272882 A1* | 9/2014 | Kaufman | G09B 5/065 |
| | | | 434/308 |
| 2015/0193651 A1* | 7/2015 | Gleim | G06K 9/00288 |
| | | | 382/118 |
| 2016/0019379 A1* | 1/2016 | Sadeh | G06F 21/32 |
| | | | 434/362 |

\* cited by examiner

DETECTION OF UNAUTHORIZED INFORMATION EXCHANGE BETWEEN USERS

BACKGROUND

Cheating among test takers has historically been a concern. Traditionally, students have been administered paper examinations. However, examinations administered via electronic devices are becoming more common. In either scenario, detection of cheating among students has conventionally been limited to human monitoring of student behavior during the examination.

BRIEF DESCRIPTION OF THE DRAWINGS

The detailed description is set forth with reference to the accompanying drawings. In the drawings, the left-most digit(s) of a reference numeral identifies the drawing in which the reference numeral first appears. The use of the same reference numerals indicates similar or identical items. Various embodiments may utilize elements and/or components other than those illustrated in the drawings, and some elements and/or components may not be present in various embodiments. As used herein, depending on the context, the singular may include the plural and vice versa.

DETAILED DESCRIPTION

Overview

Figure 1:
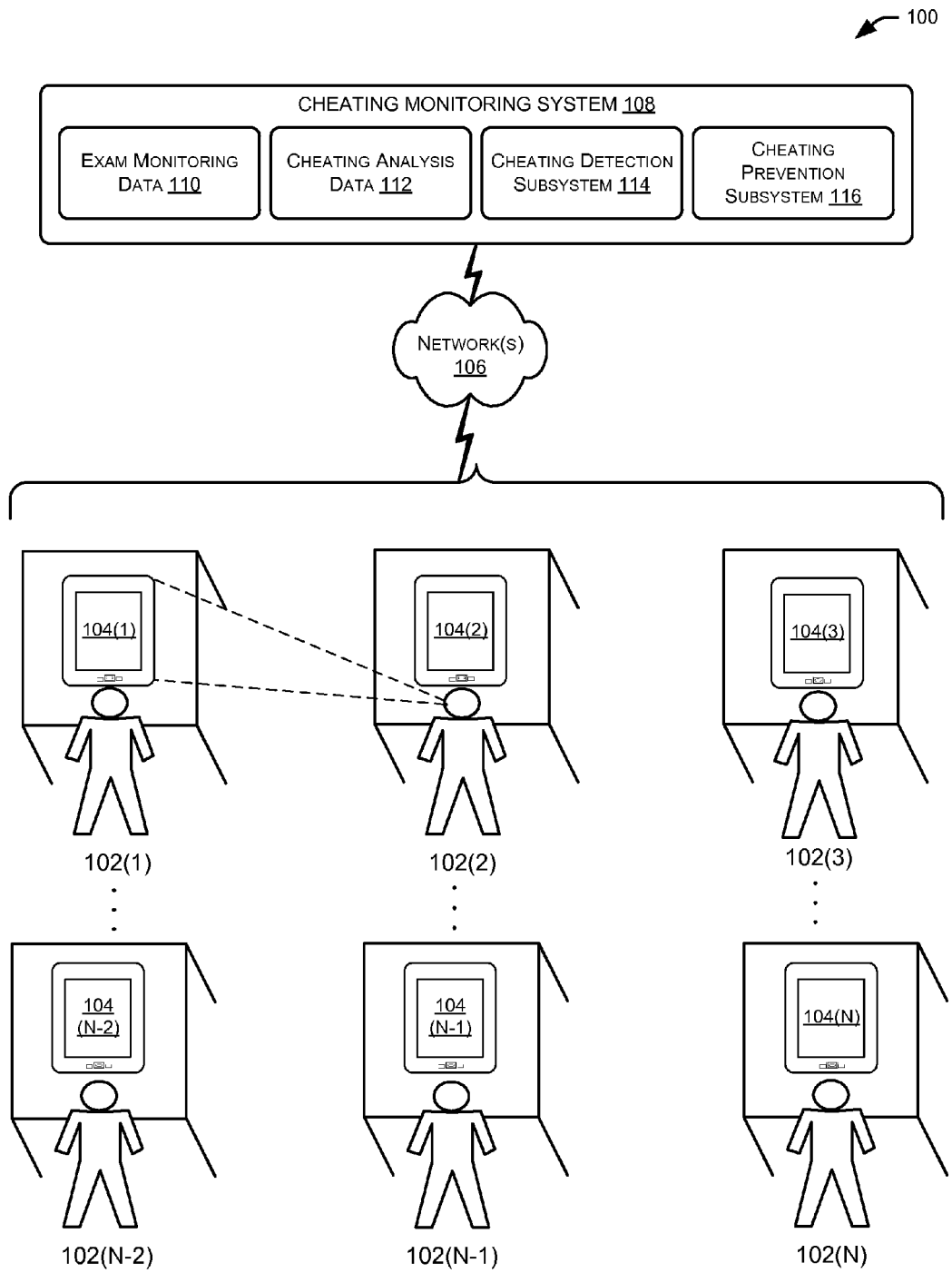
FIG. 1 depicts a high-level system architecture for detecting cheating among test takers in accordance with an exemplary embodiment of the disclosure.

Tests may be administered to test takers for various reasons including assessing knowledge retention, determining competency, and so forth. The tests may be administered to a group of test takers using user devices. For example, a test may be delivered to a user device that is associated with a particular test taker. The user device may be a tablet device, a smartphone, a laptop computer, a personal computer, a gaming console, and so forth. The user device may include a testing application that displays the test on the user device and accepts input. For example, the testing application may allow the user to scroll through pages of questions, select or input responses, flag questions to return to them later, and so forth.

A user identifier associated with a test taker may be linked to a device identifier associated with a particular user device. For example, a test taker may be required to log-in to the user device or the testing application using appropriate credentials. The test takers, and the devices they use to take the tests, may be positioned in any arrangement. The arrangement of the test takers and their user devices may be a relevant factor in assessing a likelihood that certain test takers may be cheating. For example, there is a greater likelihood that test takers seated close to one another may cheat. Also, the specific positions of test takers may be relevant. For example, if Jack is seated immediately behind Jill, Jack may be more likely to cheat off of Jill than vice versa.

Certain techniques may be used to deter cheating that take into account the positioning of the user devices. For example, if a device is moved past a certain threshold distance from a reference point such as the center of the desk, a notification, alarm, or some other indication may be provided to, for example, a test administrator such as a teacher or proctor administering the test. This may deter test takers from exchanging devices or helping others cheat during the test.

Information pertaining to factors or test taking characteristics that may be relevant to detecting cheating by test takers may be collected during administration of the test. For example, some of the information that may be collected may include how long a test taker took to answer a question or the specific time period(s) a question was viewed by the test taker. For example, specific time period information may indicate that question 2 was displayed on the test taker's device during the following time segments: 3 min 34 sec to 4 min 38 sec and from 5 min 40 sec to 6 min 34 sec. Other types of information include which questions were answered correctly, which questions were answered incorrectly and the particular incorrect responses that were provided, which questions were left unanswered, an order in which questions were answered, and so forth.

Behavioral information may also be collected. For example, information relating to a number or duration of times a test taker's eyes deviated from the screen or a number or duration of general body movements may be collected. A camera of the user device or other sensors may be used to collect such information. Information relating to device movement such as a number or duration of times the device was rotated away from the user, an angle of device rotation, and so forth may also be collected. A number or duration of times the device was idle where no user interaction with the device was detected may also be collected.

The information described above may be collected by the devices themselves or by the local or remote monitoring system. If collected by the user devices, the information may be transmitted to the local or remote monitoring system. In addition, the user devices may determine and transmit position information to the local or remote monitoring system. Alternatively, the position information may be determined by the local or remote monitoring system. The position information may indicate a proximity of one device to another (e.g., that device A is within 5 feet of device B), or may indicate more specific position information (e.g., that device A is immediately adjacent to device B).

In certain scenarios, the user devices may not be located in relative proximity to each other. For example, the user devices may not be within a range that allows for the communication of position or proximity information between the devices. An example of such a scenario is if the test takers who are taking a test using the user devices are located remotely from one another. In such scenarios, where a test may be administered to remote users, a determination as to whether a user may be cheating (described in more detail later) may not be based on a position or proximity of that's user device in relation to other user device(s). However, in certain remote test taking or learning scenarios, position or proximity information may be utilized, at least in part, to assess a potential that a user is cheating. For example, two remote test takers may be taking a test in proximity to each other using their respective user devices. In such a scenario, position or proximity information relating to the users' devices may be obtained and applied as a factor in determining a potential that the users are engaging in cheating.

The collected information may be analyzed to compare various test taking factors between users. Cheating analysis data may be generated that provides details regarding how similar the information collected for one test taker is compared to the information collected for another test taker with respect to various factors. For example, the cheating analysis data may indicate that Jack and Jill spent about 70% of the time viewing the same questions during the same periods of time and that the questions Jack and Jill both answered correctly represent 60% of the total question set for the test. The cheating analysis data may further indicate that the questions Jack and Jill both answered correctly represent 98% of the total questions answered correctly by Jack and 85% of the total questions answered correctly by Jill, that the questions Jack and Jill both answered incorrectly represent 30% of the questions answered incorrectly by Jack and 90% of the questions answered incorrectly by Jill, and so forth. These are merely examples of the type of information that may be conveyed by the cheating analysis data, and it should be appreciated that any number of comparisons may be made with respect to any number of factors. Further, while the degree of similarity between the factors is described above using percentages, any suitable metric may be used.

The cheating analysis data may also provide details pertaining to an independent analysis of the test taking information collected for a test taker. For example, the cheating analysis data may indicate which questions that Jack was determined to have answered too quickly. Each question may be associated with a minimum time that a test taker is expected to take to review the question before providing a response. This minimum response time may be determined, for example, based on a perceived complexity of the question. Information pertaining to which questions Jack answered in less than the associated minimum response time may be provided as part of the cheating analysis data.

The cheating analysis data may also provide details regarding a comparison between the content of a response provided by a test taker and available information pertaining to whether content was previously accessed by the test taker. For example, test questions may be designed to test certain previously assigned reading material. Jack may have provided responses that indicate understanding and retention of the assigned reading material; however, at the same time, it may be determined that Jack never accessed the reading material that was assigned through Jack's user device. This information may be conveyed in the cheating analysis data.

Cheating analysis data may also be generated based on test taking data associated with remote users being administered tests on their user devices. Although the test takers are being administered a test in a remote setting in which each test taker is theoretically located remotely from each other test taker, cheating is still possible between the test takers. For example, test takers may in reality be located within a close enough proximity to allow for the unauthorized exchange of information between test takers through, for example, visual, auditory, or tactile avenues.

Further, a remote test taker may be able to receive or communicate information to other test taker(s) via one or more networks or communication links that are distinct from the network(s) over which the test taking information is collected from the user devices. Thus, a test administrator may not be able to access data transmitted between test takers across these distinct networks. Still further, remote test takers may be able to communicate with one another using a communication tool that is inaccessible to a test administrator. For example, even when all functionality is disabled on user devices with the exception of perhaps the capability to receive and transmit information to local or remote monitoring computers or other trusted devices, the users of the user devices may nonetheless potentially use other communication devices to engage in the unauthorized exchange of information. Further, a remote test taker may potentially receive information from an unauthorized source other than another test taker (e.g., a cheat sheet, other content independently accessed, etc.). Accordingly, test taking data may also be collected in the remote learning scenario in connection with the user devices used by remote test takers and may be analyzed to determine cheating analysis data that may provide information regarding potential cheating among remote test takers.

A cheating metric, also referred to as a cheating score, may be generated for a test taker that provides a quantitative estimation of the likelihood that the test taker is cheating. The cheating score may be calculated by assigning weights to various aspects of the cheating analysis data, and possibly to position information received from the user devices as well. For example, in an exemplary scenario, the cheating analysis data may indicate that Jack and Jill spent 95% of the time viewing the same questions during the same periods of time, that the questions Jack and Jill both answered correctly represent 98% of the total questions answered correctly by Jack and 85% of the total questions answered correctly by Jill, that the questions Jack and Jill both answered incorrectly represent 80% of the questions answered incorrectly by Jack and 90% of the questions answered incorrectly by Jill, and so forth. In this exemplary scenario, respective cheating scores calculated for Jack and Jill may indicate a high probability that cheating involving Jack, or Jill, or both may have occurred.

The position information may be taken into account in calculating the cheating score. For example, even if several of the factors that are analyzed indicate that Jack or Jill may have been involved in cheating, the position information received may indicate that they were seated very far apart, in which case the cheating score may be correspondingly reduced to reflect this fact. For example, a large negative weight may be applied to the position factor as compared to small positive weights applied to the other test taking factors, so that the cheating scores generated for Jack and Jill are relatively small. In alternate scenarios, the position information may not be taken into account when the cheating scores are calculated, and instead, a test administrator may discount high cheating scores received for Jack and Jill by observing that they are not seated near one another.

In certain scenarios, the cheating scores calculated for Jack and Jill may not provide a clear indication of who specifically cheated (e.g., whether Jack cheated off of Jill, Jill cheated off of Jack, Jack and Jill both cheated off of each other, etc.). In such scenarios, a test administrator may utilize the cheating analysis data or the cheating scores to further investigate whether any potential cheating is occurring or has occurred. For example, the cheating analysis data or the cheating scores may be provided to a test administrator in real-time during administration of the test to allow the test administrator to make an independent judgment as to whether cheating is likely occurring and what, if any, preventive measures should be taken.

The test administrator may have prior knowledge regarding the test takers (e.g., past performance on tests, study habits, etc.) that allows the test administrator to make a more informed decision. For example, even though the cheating scores calculated for Jack and Jill may indicate a high likelihood that cheating is occurring, and even though Jack and Jill may be seated next to one another, the test administrator may know that Jack and Jill are good students, and thus may disregard the cheating scores. In other embodiments, the test administrator may utilize information that he/she gleans from observing the test takers during administration of the test. For example, the cheating scores calculated for Jack and Jill may indicate a high likelihood of cheating, but the test administrator may determine that Jack and Jill are not sitting close enough to make cheating feasible. In such a scenario, the test administrator may disregard the cheating scores.

In certain scenarios, a higher cheating score calculated for Jack as compared to Jill may indicate that it is more likely that Jack cheated off of Jill than the other way around. For example, Jack may have been able to cheat off of Jill only intermittently during the test, and as such, the questions that both Jack and Jill answered correctly may represent a larger percentage of the total questions that Jack answered correctly than the total questions that Jill answered correctly. Jack may also have left a greater number of questions unanswered than Jill. Further, of the questions that both Jack and Jill answered correctly, Jill may have provided her response before Jack for a majority of the questions. Factors such as these may result in Jack's cheating score being greater than Jill's cheating score, and may indicate that it is more likely that Jack cheated off of Jill. Also, the position information may influence a test taker's cheating score. For example, Jack may be seated behind Jill thereby making it more likely that Jack cheated off of Jill, and this seating arrangement may increase Jack's cheating score while correspondingly lowering Jill's cheating score.

In those scenarios where it can be determined with some level of certainty that Jack cheated off of Jill rather than the other way around, it may not be obvious from the cheating scores themselves whether Jill was unaware of Jack's cheating or whether Jill may have actively facilitated or assisted Jack in cheating. However, information included in the cheating analysis data may provide some indication as to whether Jill helped Jack cheat. For example, the behavioral information associated with Jill may indicate that Jill's device was rotated several times during the test past a threshold angle of rotation from Jill's line of sight. Rotation angles above the threshold may indicate that the device screen is intentionally being rotated towards another test taker. Other information included in the cheating analysis data may also be used to determine a likelihood that Jill was assisting Jack in cheating. For example, the cheating analysis data may indicate that Jill repeatedly revisited questions that she already answered, possibly to provide Jack with more opportunities to cheat. In other scenarios, the position information may be assessed to determine the likelihood that Jill helped Jack cheat. For example, if Jill is seated in front of Jack, it is more likely that Jill may have been unaware of Jack's cheating as compared to a scenario in which Jack and Jill are seated side by side.

The cheating scores calculated for a test taker may be compared to a predetermined cheating threshold. The cheating threshold may be specific to a particular test taker associated with the cheating score. For example, the cheating threshold may vary based on historical data associated with the test takers and/or position information. For example, if the historical data indicates that both Jack and Jill are very studious and have performed well on previous examinations, a higher cheating threshold may be applied against cheating score(s) calculated for Jack and Jill. In contrast, if the historical data indicates that Jack has historically performed well on examinations but Jill has not, the cheating threshold may be lower, because there may be a higher likelihood that Jill may cheat off of Jack.

Similarly, in those scenarios or otherwise, in which the position information is not taken into account in calculating the cheating score, the cheating threshold applied against that cheating score may vary based on the position information. For example, if Jack and Jill are seated far from each other, a higher threshold may be used. Alternatively, if Jack and Jill are seated in close proximity, a lower threshold may be used.

If it is determined that a cheating score exceeds an associated cheating threshold, one or more measures for preventing or deterring the potential cheating may be identified. The preventive measures may prevent or deter cheating by the test takers by negating or mitigating the benefits of cheating. Example preventive measures include randomizing an order in which questions or answer choices are presented to the test takers, selecting different sets of questions for each test taker from a pool of similar questions, and so forth. The cheating score calculated for a test taker may be iteratively re-calculated after preventive measures are implemented in order to assess their effectiveness.

In other scenarios, the preventive measures may be provided to a local monitoring system. A test administrator may access the preventive measures through the local monitoring system and may decide which preventive measures to implement, if at all, based on his/her assessment of the likelihood that cheating is occurring. That assessment may be based on the cheating analysis data, the cheating scores, and/or information gleaned from observing the test takers.

Illustrative Architecture

FIG. 1 depicts a high-level system architecture for detecting cheating among test takers in accordance with an exemplary embodiment of the disclosure. While FIG. 1 relates to detection of cheating by test takers, it will be appreciated by one of ordinary skill in the art that the system architecture 100 may be used to detect, prevent, and/or deter any manner of unauthorized information exchange or acquisition between or among users of user devices. While various elements/components of the system architecture 100 may be described using plural terminology, it should be understood that such plural terminology encompasses the singular.

The system architecture 100 may include user devices 104(1)-104(N) that test takers 102(1)-102(N) may use to take tests. The user devices 104(1)-104(N) may be any device capable of receiving input including, but not limited to, a smartphone or other device with cellular capabilities, a tablet device, a personal digital assistant (PDA), an electronic reader device, a desktop computing device, a laptop computing device, a mainframe computing device, a gaming console, a multimedia content streaming device, or any other device capable of receiving input. Examination questions may be presented to the test takers 102(1)-102(N), and input may be received from the test takers via any type of device interface including a graphical user interface (GUI), a command line interface (CLI), a Braille or haptic interface, an auditory interface, and so forth.

Each of the test takers 102(1)-102(N) may associate himself/herself with a respective user device 104(1)-104(N) using, for example, a user identifier. A test taker 102(1)-102(N) may log on to a respective user device 104(1)-104(N) by inputting his/her user identifier and other appropriate authentication credentials to the device. The user identifier may be associated, for example, with a device identifier such as, for example, a Media Access Control (MAC) address. A testing application may be provided on the user devices 104(A)-104(N) for presenting test questions to the test takers 102(1)-102(N) and for receiving inputs from the test takers 102(1)-102(N). A particular test taker may log on to a respective device generally and/or may log on to the testing application specifically. A test taker may be prevented from logging out of a testing application until the test is complete. This may prevent test takers from transferring devices between one another during a test.

In accordance with various embodiments, the user devices 104(1)-104(N) may be configured to communicate via one or more networks 106. The network(s) 106 may include, but are not limited to, any one or a combination of different types of suitable communications networks, such as cable networks, the Internet, wireless networks, cellular networks, and other private and/or public networks. Further, the network(s) 106 may include any type of medium over which network traffic is carried including, but not limited to, coaxial cable, twisted wire pair, optical fiber, hybrid fiber coaxial (HFC), microwave terrestrial transceivers, radio frequency communications, satellite communications, or combinations thereof.

In one or more specific embodiments, the user devices 104(1)-104(N) may be configured to communicate via one or more wireless networks included in the network(s) 106. For example, the user devices 104(1)-104(N) may be configured to communicate using Near field communication (NFC) standards, by establishing a personal area network (PAN) using Bluetooth® communication standards, via a wired or wireless local area network (LAN) such as a wireless LAN utilizing the Institute of Electrical and Electronics Engineers (IEEE) 802.11 Wireless Fidelity (Wi-Fi) standards, and so forth.

The test takers 102(1)-102(N) and the user devices 104(1)-104(N) that they use to take the tests may be arranged in any suitable manner. Most typically, desks in a classroom are arranged in a grid pattern as depicted in FIG. 1. Occasionally, students may be seated in a circular arrangement. However, any arrangement is possible. Each of the user devices 104(1)-104(N) may be configured to determine its position in relation to the other user devices 104(1)-104(N) using the connectivity between the devices. Each user device 104(1)-104(N) may be aware of its position within the arrangement of user devices and of each other device's position. For example, user device 104(N-1) associated with test taker 102(N-1) may be aware that it is positioned immediately adjacent to user device 104(N-2) on one side and user device 104(N) on another side. One of ordinary skill in the art will appreciate that numerous other positional relationships between user devices 104(1)-104(N) are possible. In various other embodiments, each of the test takers 102(1)-102(N) may be required to "register" the particular user device that he/she may be using by, for example, scanning a bar code located at the test taker's seating location, on a document, and so forth with the user device. In other embodiments, a test administrator may arrange the test takers 102(1)-102(N) and their corresponding user devices 104(1)-104(N) according to a pre-defined arrangement and input the pre-defined arrangement to a local monitoring system, which may, in turn, convey that information to a remote monitoring system.

In certain embodiments, the user devices 104(1)-104(N) may only be able to determine proximity information. For example, user device 104(1) may be able to determine that it is within 5 feet of user device 104(2) but not within 5 feet of user device 104(N-2). In other embodiments, each user device 104(1)-104(N) may be able to determine both proximity information and position information.

In various embodiments, certain functionality may be restricted on the user devices 104(1)-104(N). For example, the test takers 102(1)-102(N) may be prohibited from sharing data or information between the user devices 104(1)-104(N), may be restricted from downloading content, may be restricted from accessing the Internet generally or certain prohibited websites (e.g., social networking sites, Wikipedia™, etc.), and so forth. Thus, in certain embodiments, a particular user device may only be able to communicate with the cheating monitoring system 108 and may only be able to communicate and/or obtain from another user device proximity and/or position information.

The position information that indicates a relative position of each user device 104(1)-104(N) with respect to each other user device may be provided via the network(s) 106 to a cheating monitoring system 108. In certain embodiments, the cheating monitoring system 108 may be located entirely remotely from the user devices 104(1)-104(N). In other embodiments, at least a portion of the functionality provided by the cheating monitoring system 108 may be provided locally in connection with a local monitoring system located in proximity to the user devices 104(1)-104(N).

As will be described in more detail through reference to FIG. 2, the cheating monitoring system 108 may comprise one or more computers, each having at least one processor and at least one memory. The at least one memory may store exam monitoring data 110. The exam monitoring data 110 may include information pertaining to factors or test taking characteristics associated with the test takers 102(1)-102(N) or their user devices 104(1)-104(N) which may be taken into account in detecting cheating by the test takers.

For example, in the example embodiment depicted in FIG. 1, test questions may be presented to the test takers 102(1)-102(N) via the user devices 104(1)-104(N). Each of the test takers 102(1)-102(N) may provide inputs to the user devices 104(1)-104(N) that indicate their responses to the questions. Depending on the format of the examination and the user interface(s) offered by the user devices 104(1)-104(N), the responses may be provided by tactile selection of answer choices, by auditory input of responses, by free-form entry of text, and so forth.

The exam monitoring data 110 may include any data relating to the information (e.g., responses) inputted by the test takers 102(1)-102(N) to the user devices 104(1)-104(N). The exam monitoring data 110 that is collected may include, for example, how long a test taker took to answer a question (response time data) or the specific time period(s) a question was viewed by the test taker (viewing time period data). Other types of monitoring information that may be collected include which questions were answered correctly, which questions were answered incorrectly and the particular incorrect responses that were provided, which questions were left unanswered, an order in which questions were answered, the particular times at which answers were received, and so forth.

The exam monitoring data 110 may also include behavioral data associated with the test takers. The behavioral data may relate to one or more test taker actions detected by various detection element(s) of a user device. For example, the behavioral data may include data indicating a number or duration of times a test taker's eyes deviated from a reference point on the user device, data relating to audible sounds generated by the test taker during the test, data indicating rotation of the user device away from a reference axis and past a threshold angle, and so forth. One of ordinary skill in the art will appreciate the foregoing is not an exhaustive list of the types of data or the various test taker or test taking characteristics they may relate to, and that any data that may be analyzed to determine a potential for cheating may be included in the exam monitoring data 110.

The exam monitoring data 110 may be identified, collected, and/or aggregated utilizing processing capabilities associated with the user devices 104(1)-104(N) themselves. The exam monitoring data 110 may then be transmitted via the network(s) 106 to the cheating monitoring system 108 and stored therein. In certain embodiments, the cheating monitoring system 108, which may be located remotely, at least in part, from the user devices 104(1)-104(N) may identify, gather, collect and/or aggregate the exam monitoring data 110 entirely remotely, or may offload at least a portion of the data collection responsibility to a local cheating monitoring system 108 located in proximity to the user devices 104(1)-104(N). The cheating monitoring system 108 may, in various embodiments, include one or more remote components and/or one or more local components with respect to the user devices 104(1)-104(N).

The cheating monitoring system 108 may further include a cheating detection subsystem 114 and a cheating prevention subsystem 116. In various embodiments, the cheating detection subsystem 114 and/or the cheating prevention subsystem 116 may include modules comprising computer-executable instructions that, upon execution by one or more processors, causes various operations to be performed. Further, although depicted in FIG. 1 as separate subsystems, the cheating detection subsystem 114 and the cheating prevention subsystem 116 may include components that form at least part of a same subsystem.

The cheating detection subsystem 114 may receive the exam monitoring data 110 and/or the position information from the user devices 104(1)-104(N) and/or from local cheating monitoring system 108 components. In other embodiments, the cheating detection subsystem 114 may remotely collect or gather the exam monitoring data 110 by monitoring various characteristics associated with the responses received from test takers and/or various characteristics associated with the test takers themselves. The cheating detection subsystem 114 may analyze the exam monitoring data 110 and/or the position information to generate cheating analysis data 112.

The cheating analysis data 112 may provide details regarding various comparisons made between various test taking factors or characteristics associated with different test takers. For example, the cheating analysis data 112 may provide details regarding how similar a portion of exam monitoring data 110 associated with one test taker is compared to a portion of the exam monitoring data 110 associated with another test taker with respect to various factors. For example, the cheating analysis data 112 may indicate a similarity metric or a degree of correspondence between viewing time periods associated with different test takers (e.g., that Jack and Jill spent about 70% of the time viewing the same questions during the same periods of time).

The cheating analysis data 112 may also indicate a similarity metric or a degree of correspondence between questions answered correctly by different test takers, questions answered incorrectly, questions left unanswered, and so forth. For example, the cheating analysis data 112 may indicate that the questions Jack and Jill both answered correctly represent 60% of the total question set for the test, that the questions Jack and Jill both answered correctly represent 98% of the total questions answered correctly by Jack and 85% of the total questions answered correctly by Jill, that the questions Jack and Jill both answered incorrectly represent 30% of the questions answered incorrectly by Jack and 90% of the questions answered incorrectly by Jill, and so forth.

The cheating analysis data 112 may further indicate a similarity metric or a degree of correspondence between an order in which responses were received by different test takers. For example, the cheating analysis data 112 may indicate that 15 of the responses received from Jack and Jill were received in the same order, or that 80% of the total responses received from Jack and 60% of the total responses received from Jill were received in the same order, and so forth.

The cheating analysis data 112 may further indicate certain response time characteristics. For example, the cheating analysis data 112 may identify the questions that Jack answered within a predetermined minimum threshold of time (e.g., questions Jack answered "too quickly"). The predetermined minimum threshold of time may be specific to a question and may be based, for example, on a perceived difficulty of the question. For example, a more difficult question may have a higher threshold than a question of lesser difficulty. A comparison with the response times of other test takers may also be provided. For example, the cheating analysis data 112 may indicate which questions both Jack and Jill provided responses for within the associated minimum threshold response times for those questions.

The cheating analysis data 112 may also provide details regarding analysis performed on behavioral data associated with the test takers. For example, the cheating analysis data 112 may provide details regarding whether a test taker's eyes deviated beyond a certain threshold angle from a reference point or a number or duration of times of any such deviations. The cheating analysis data 112 may also indicate whether a test taker's device was rotated beyond a threshold angle from a reference axis or a number or duration of times of any such rotations.

The cheating analysis data 112 may also provide details regarding a comparison between the content of a response provided by a test taker and available information pertaining to whether content was previously accessed by the test taker. For example, test questions may be designed to test certain previously assigned reading material. Jack may have provided responses that indicate understanding and retention of the assigned reading material; however, at the same time, it may be determined that Jack never accessed the reading material that was assigned through Jack's user device. This information may be conveyed in the cheating analysis data 112.

These are merely examples of the type of information that may be conveyed by the cheating analysis data 112, and it should be appreciated that any number of comparisons may be made using the exam monitoring data 110 based on any number of factors. Further, while the degree of similarity between the factors is described above using percentages, any suitable metric may be used.

The cheating detection subsystem 114 may provide various entities with access to the cheating analysis data 112 that is generated. Access may be provided, for example, to a test administrator who is overseeing administration of the test via a web-based portal, by transmitting the cheating analysis data 112 to a local monitoring system 108 used by the test administrator, and so forth.

The cheating detection subsystem 114 may generate a metric based at least in part on the cheating analysis data 112 and/or the position information. The metric may be included in the cheating analysis data 112. The metric may represent a quantitative measure of the likelihood that responses provided by a test taker were obtained from an unauthorized source such as another test taker, responses provided by another test taker, another unauthorized source (e.g., a cheat sheet), and so forth. The metric may be calculated by assigning different weights to different factors to which the cheating analysis data 112 relates. In the example embodiment depicted in FIG. 1, the calculated metric may correspond to a cheating score that indicates an estimated probability that certain test takers engaged in cheating during the test.

In various embodiments, a single cheating metric of cheating score may be calculated for a group of test takers indicating a likelihood that cheating occurred between various test takers in the group. For example, a single cheating score may be calculated for both Jack and Jill that indicates a likelihood that Jack and/or Jill engaged in cheating. In such embodiments, the cheating score may not, in and of itself, provide a clear indication as to whether Jack alone, Jill alone, or both cheated. Other information such as cheating analysis data indicating which test taker responses were received first, behavioral data, observational information gleaned by a test administrator, and so forth may be analyzed to determine with a greater level of certainty which test taker may have cheated and whether the other test taker was unaware of the cheating or whether the other test taker facilitated the cheating.

In other embodiments, a respective cheating score may be calculated for each test taker. For example, a cheating score may be calculated for Jack, and a cheating score may be calculated for Jill based on cheating analysis data 112 that pertains to Jack and/or Jill. The cheating score calculated for Jack may indicate a likelihood that Jack cheated off of Jill while the cheating score calculated for Jill may indicate a likelihood that Jill cheated off of Jack. The cheating score for Jack and Jill may differ based on various factors that indicate that either Jack or Jill was more likely to have engaged in cheating.

The cheating analysis data 112 including the cheating score(s) may be provided in real-time to a test administrator such as a teacher, and may be provided via a web-based portal, transmitted to a local cheating monitoring system 108 accessible by the teacher, and so forth. The local cheating monitoring system 108 may include any one or more devices including, for example, a device similar to any of the user devices 104(1)-104(N). A teacher may review the cheating analysis data in real time to determine whether to investigate potential cheating more closely or whether to implement preventive measures, which are discussed in more detail below.

In various embodiments, the cheating detection subsystem 114 may compare a calculated cheating score to a predetermined cheating threshold to determine whether the cheating score exceeds the threshold. The threshold may vary in dependence on the particular cheating score, and may be based on historical data associated with the test taker(s) to whom the cheating score relates and/or the position information associated with the test taker(s). If it is determined that a particular cheating score exceeds an associated predetermined cheating threshold, the cheating detection subsystem 114 may provide this information to the cheating prevention subsystem 116. In one or more alternate embodiments, the cheating prevention subsystem 116 may perform the determination.

The cheating prevention subsystem 116 may include computer-executable instructions for identifying one or more preventive measures to be taken in response to a determination that a particular cheating score exceeds a predetermined cheating threshold. The preventive measure(s) may be designed to prevent and/or deter future potential cheating among test takers by, for example, eliminating and/or mitigating the potential benefits of cheating. The preventive measure(s) may include randomizing an order in which a set of additional questions are presented to different test taker(s), randomizing an order in which answer choices are presented to different test taker(s), selecting different sets of questions from a pool of related questions for presentation to different test taker(s), and so forth. Examples of such preventive measures will be described in more detail through reference to FIGS. 7-9. One of ordinary skill in the art will appreciate that the foregoing is not an exhaustive list of possible preventive measures and that any suitable preventive measures may be identified and implemented.

The cheating prevention subsystem 116 may be configured to automatically implement the identified preventive measures in real-time during administration of the examination to create a "smart test." Alternatively, access to the preventive measures may be provided to a local monitoring/detection/prevention tool associated, for example, with a local monitoring system. A test administrator may utilize the local monitoring/detection/prevention tool to determine whether to implement the preventive measures based on existing knowledge available to the administrator such as, for example, historical knowledge regarding the users, knowledge regarding past examination data, knowledge regarding study habits of the test takers, knowledge gleaned from observing the test takers during the test, and so forth. The preventive measures may include those previously discussed which may be implemented via the user devices 104(1)-104(N). Alternatively, the preventive measures may include manual measures such as relocating the test takers suspected of cheating, requiring the test takers to complete the test at different times, and so forth.

Figure 2:
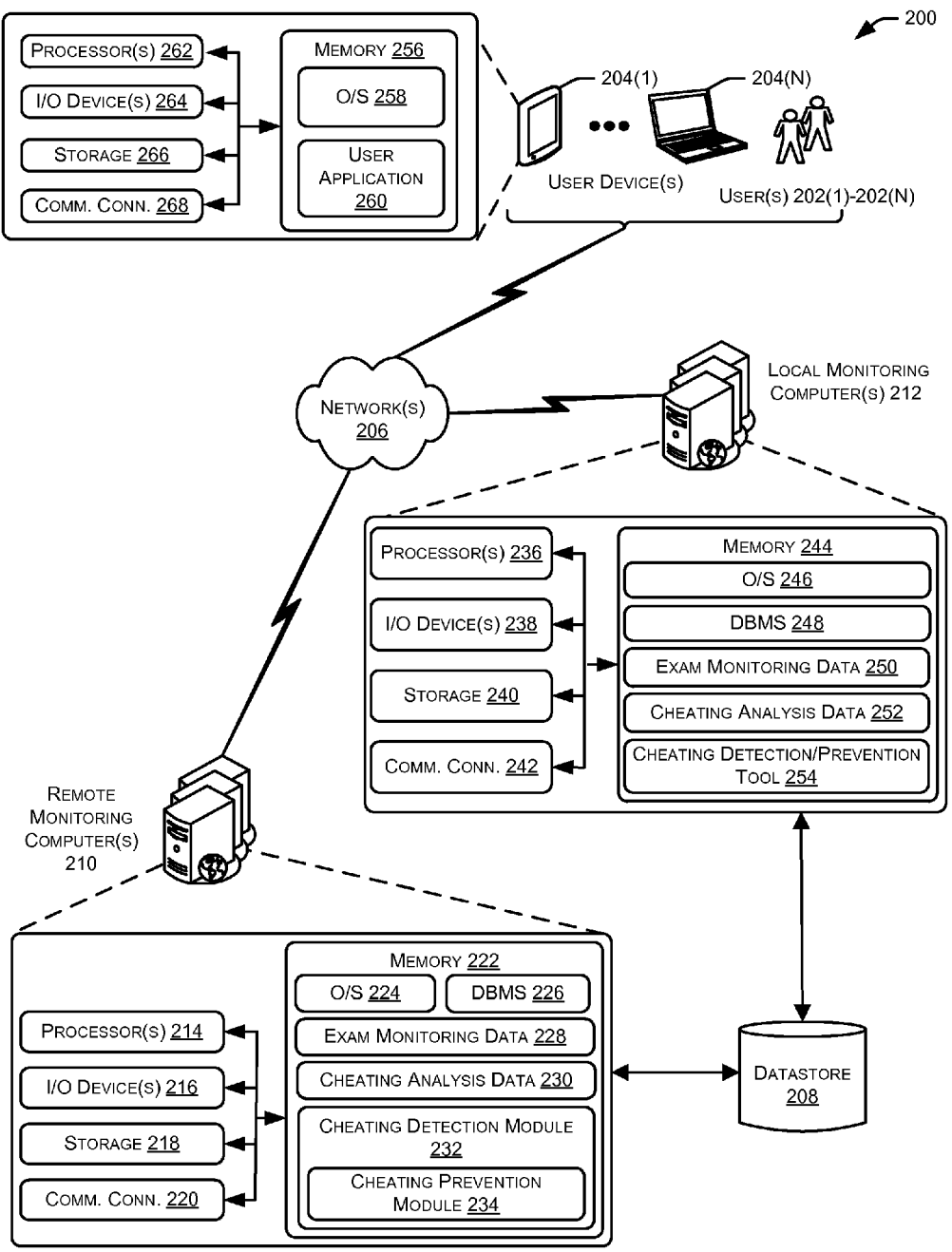
FIG. 2 depicts a more detailed system architecture for detecting and deterring an unauthorized information exchange between users of user devices in accordance with an embodiment of the disclosure.

FIG. 2 depicts a more detailed illustrative system architecture 200 for detecting and/or preventing an unauthorized exchange or acquisition of information by users of user devices. In one or more embodiments, the unauthorized exchange or acquisition of information may correspond to cheating by test takers who are being administered a test using the user devices.

The illustrative architecture 200 includes user devices 204(1)-204(N) which may correspond to user devices 104(1)-104(N). The illustrative architecture 200 may further include local monitoring computer(s) 212 and remote monitoring computer(s) 210 as well as one or more datastores 208. The user devices 204(1)-204(N), the local monitoring computer(s) 212, and/or the remote monitoring computer(s) 210 may be capable of communicating via the network(s) 206, which may correspond to any of the networks described through reference to network(s) 106 depicted in FIG. 1.

The user devices 204(1)-204(N) are respectively associated with users 202(1)-202(N), who may correspond to test takers 102(1)-102(N). The users 202(1)-202(N) may each provide a set of inputs to their respective user devices 204(1)-204(N), which may in various embodiments correspond to responses to test questions presented to the users 202(1)-202(N) via the user devices 204(1)-204(N).

Each of the user devices 204(1)-204(N) may include at least one memory 256 and one or more processing units (or processor(s) 262). The processor(s) 262 may be implemented as appropriate in hardware, software, firmware, or combinations thereof. Software or firmware implementations of the processor(s) 262 may include computer-executable or machine-executable instructions written in any suitable programming language to perform the various functions described. Similarly, hardware implementations of the processor(s) 262 may be configured to execute computer-executable or machine-executable instructions to perform the various functions described.

The memory 256 may store program instructions that are loadable and executable on the processor(s) 262, as well as data generated during the execution of these programs. Depending on the configuration and type of user device 204, the memory 256 may be volatile (such as random access memory (RAM)) and/or non-volatile (such as read-only memory (ROM), flash memory, etc.). The user device 204 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data. In some implementations, the memory 256 may include multiple different types of memory, such as static random access memory (SRAM), dynamic random access memory (DRAM), and/or ROM.

The user devices 204(1)-204(N) may also include additional storage 266, which may include removable storage and/or non-removable storage. The additional storage 266 may include, but is not limited to, magnetic storage, optical disks, and/or tape storage. The disk drives and their associated computer-readable media may provide non-volatile storage of computer-readable instructions, data structures, program modules, and other data for the computing devices. In some implementations, the memory 256 may include multiple different types of memory, such as static random access memory (SRAM), dynamic random access memory (DRAM), and/or ROM.

The memory 256 and/or the additional storage 266, removable and/or non-removable, are all examples of computer-readable storage media. For example, computer-readable storage media may include volatile and/or non-volatile, removable and/or non-removable media implemented according to any method or technology for storage of information such as computer-readable instructions, data structures, program modules, and/or other data.

The user devices 204(1)-204(N) may also include communications connection(s) 268 that allow the user devices 204(1)-204(N) to communicate with datastores, other computing devices or servers, user terminals, and/or other devices via the network(s) 206. For example, the user devices 204(1)-204(N) may utilize the communications connection(s) 268 to communicate with the local monitoring computer(s) 212 and/or the remote monitoring computers 210.

The user devices 204(1)-204(N) may also include input/output (I/O) device(s) 264, such as a keyboard, a mouse, a pen, a voice input device, a touch input device, a display, speakers, a camera, a microphone, a printer, etc. The I/O device(s) 264 may provide any type of interface for receiving input including a graphical user interface, a command line interface, a haptic interface, an auditory interface, and so forth.

The I/O device(s) 264 may be used to monitor various behavioral characteristics of a user and to gather various behavioral data. For example, a camera may be used to monitor a user's eye movement during administration of an examination and to gather various data relating thereto. Further, a microphone may be used to detect various audible inputs generated by the user, record the inputs, and/or generate various data relating thereto. Further, one or more of the I/O devices 264 may be used to authenticate a user using, for example, biometric information.

Turning to the contents of the memory 256 in more detail, the memory 256 may include an operating system 258 and one or more application programs or services for implementing the features disclosed herein, including at least one user application 260, such as a web-based browser application, a dedicated software application (e.g., a smartphone application, a tablet application, etc.), or the like. A user 202 may use the user application 260 to view questions, provide responses, and so forth. The user application 260 may provide various types of functionality to the user 202 such as functionality that allows the user to scroll through pages of questions, flag questions for later viewing or response, and/or provide input via a tactile or auditory interface. In various embodiments, the user application 260 may be further configured to identify and/or aggregate exam monitoring data relating to responses provided by a user of the device.

The remote monitoring computer(s) 210 may be configured to receive and store exam monitoring data 228 and/or position information from the user devices 204(1)-204(N) and/or the local monitoring computer(s) 212, generate cheating analysis data 230 based at least in part on the exam monitoring data 228, and provide access to the cheating analysis data 230 to a test administrator via, for example, the local monitoring computer(s) 212.

Each of the remote monitoring computer(s) 210 may include at least one memory 222 and one or more processing units (or processor(s)) 214. The processor(s) 214 may be implemented as appropriate in hardware, software, firmware, or combinations thereof. Software or firmware implementations of the processor(s) 214 may include computer-executable or machine-executable instructions written in any suitable programming language to perform the various functions described. Similarly, hardware implementations of the processor(s) 214 may be configured to execute computer-executable or machine-executable instructions to perform the various functions described.

The memory 222 may store program instructions that are loadable and executable on the processor(s) 214, as well as data generated during the execution of these programs.

Depending on the configuration and type of the remote monitoring computer 210, the memory 222 may be any of the types or configurations of memory previously described.

Each of the remote monitoring computers 210 may also include additional storage 218, which may include any removable storage and/or non-removable storage including any of the types and configurations previously described.

Each of the remote monitoring computer(s) 210 may also include communications connection(s) 220 that allow the remote monitoring computer(s) 210 to communicate with datastores, other computing devices or servers, user terminals, and/or other devices via the network(s) 206. For example, the remote monitoring computer(s) 210 may utilize the communications connection(s) 220 to communicate with the local monitoring computer(s) 212 and/or the user devices 204(1)-204(N). The remote monitoring computer(s) 210 may also include input/output (I/O) device(s) 216 which may include any of those previously described.

The memory 222 may include an operating system 224, a database (or datastore) management system (DBMS) 226, exam monitoring data 228, cheating analysis data 230, a cheating detection module 232, and a cheating prevention module 234. The exam monitoring data 228 may correspond to test taking data received from the user devices 204(1)-204(N) and/or test taking data received from the local monitoring computer(s) 212 and may include any of the monitoring data previously described. The cheating detection module 232 may include computer-executable instructions configured to be executed by the processor(s) 214 to generate the cheating analysis data 230 based at least in part on the exam monitoring data 228.

The cheating analysis data 230 may include data generated from analyzing the exam monitoring data 228 including any analysis data generated based on a comparison of portions of the exam monitoring data 228 relating to different users. The cheating detection module 232 may further generate one or more metrics based on the cheating analysis data 230 and/or the position information that may be received, for example, from the user devices 204(1)-204(N). The cheating detection module 232 may provide a test administrator or other entity with access to the cheating analysis data 230 via, for example, a cheating detection/prevention tool 254 provided in connection with the local monitoring computer(s) 212. The cheating detection/prevention tool 254 may be, for example, a web-based portal that provides an administrator with access to the remote monitoring computer(s) 210. The cheating analysis data 230 received from the remote monitoring computer(s) 210 may be stored as cheating analysis data 252 in at least one memory 244 associated with the local monitoring computer(s) 212.

The memory 222 may further include a cheating prevention module 234 which may include computer-executable instructions configured to be executed by the processor(s) 214 to identify one or more preventive measures such as any of those previously described. Although depicted as a submodule of the cheating detection module 232, the cheating prevention module 234 may also be provided as an independent module. The cheating detection module 232 and/or the cheating prevention module 234 may include computer-executable instructions configured to be executed by the processor(s) 214 to generate one or more metrics (e.g., cheating scores or metrics, similarity metrics, etc.) based on the cheating analysis data 230 that is generated and/or the position information received from, for example, the user devices 204(1)-204(N).

Each metric may be generated by application of various weights to various test taking factors to which the cheating analysis data 230 relates. A suitable weight may also be applied to the position information. A generated metric may represent an estimated likelihood that one or more users in a group of users may be engaging in an unauthorized information exchange. A generated metric may in certain scenarios indicate an estimate likelihood that a particular user may be acquiring information in an unauthorized manner from any number of other users or from information inputted by those users to their respective user devices.

The generated metric(s) may be provided by the remote monitoring computer(s) 210 to the local monitoring computer(s) 212 as part of the cheating analysis data 230, or independently from the cheating analysis data 230 via, for example, the cheating detection/prevention tool 254. The cheating analysis data 230 and/or the generated metric(s) may be provided to the local monitoring computer(s) 212 in real-time during administration of an examination. In one or more embodiments, a generated metric may correspond to a "probability of cheating score" that provides an estimation of the likelihood that one or more users are engaging in cheating.

The cheating detection module 232 and/or the cheating prevention module 234 may include computer-executable instructions configured to be executed by the processor(s) 214 to determine whether a generated metric exceeds a predetermined threshold. For example, it may be determined whether a calculated cheating score exceeds a predetermined cheating threshold. Each predetermined threshold may be uniquely determined with respect to an associated metric based on, for example, historical data associated with the users associated with the metric, position information associated with the devices being used by the users, and so forth. If it is determined that the metric exceeds the predetermined threshold (e.g., that the likelihood that a particular user is cheating or that one or more users of a group of users is cheating is above a certain threshold), the cheating prevention module 234 may include computer-executable instructions configured to identify one or more preventive measures.

The preventive measure(s) may be designed to prevent and/or deter cheating in connection with an examination in progress or in connection with future examinations, and may be automatically implemented during the examination. For example, the remote monitoring computer(s) 210 may control one or more of the user devices 204(1)-204(N) to implement the preventive measures. Alternatively, the one or more preventive measures may be provided by the remote monitoring computer(s) 210 to the local monitoring computer(s) 212 via, for example, the cheating detection/prevention tool 254. As an example, a test administrator having access to the cheating detection/prevention tool 254 may receive information regarding the one or more preventive measures, and may be provided with a capability to control the implementation of all, some, or none of the preventive measures.

Each of the local monitoring computer(s) 212 may include at least one memory 244 and one or more processing units (or processor(s)) 236. In accordance with one or more embodiments of the disclosure, the local monitoring computer(s) 212 may include any one or more computing devices including, but not limited to, a server, a mainframe computer, a desktop computer, a laptop computer, a tablet device, a smartphone, a gaming console, and so forth. The processor(s) 236 may be implemented as appropriate in hardware, software, firmware, or combinations thereof.

Software or firmware implementations of the processor(s) 236 may include computer-executable or machine-executable instructions written in any suitable programming language to perform the various functions described. Similarly, hardware implementations of the processor(s) 236 may be configured to execute computer-executable or machine-executable instructions to perform the various functions described.

The memory 244 may store program instructions that are loadable and executable on the processor(s) 236, as well as data generated during the execution of these programs. Depending on the configuration and type of the local monitoring computer 212, the memory 244 may be of any type or configuration such as any of those previously described. Each of the local monitoring computers 212 may also include additional storage 240, which may include removable storage and/or non-removable storage, including any of the types or configurations of storage previously described.

Each of the local monitoring computer(s) 212 may also include communications connection(s) 242 that allow the local monitoring computer(s) 212 to communicate with datastores, other computing devices or servers, user terminals, and/or other devices via the network(s) 206. For example, the local monitoring computer(s) 212 may utilize the communications connection(s) 242 to communicate with the remote monitoring computer(s) 210 and/or the user devices 204(1)-204(N). The local monitoring computer(s) 212 may also include input/output (I/O) device(s) 238, such as a keyboard, a mouse, a pen, a voice input device, a touch input device, a display, speakers, a camera, a microphone, a printer, etc.

The memory 244 may include an operating system 246, a database (or datastore) management system (DBMS) 248, exam monitoring data 250, cheating analysis data 252, and a cheating detection/prevention tool 254. The exam monitoring data 250 may correspond to the exam monitoring data 228 received from the remote monitoring computer(s) 210 and stored in the memory 244. Alternatively, the exam monitoring data 250 may include monitoring data identified, gathered, accumulated, or otherwise generated based on monitoring, via the cheating detection/prevention tool 254, for example, of inputs provided by the users 202(1)-202(N) to the user device(s) 204(1)-204(N).

The cheating analysis data 252 may correspond to the cheating analysis data 230 received from the remote monitoring computer(s) 210 and stored in the memory 244. In other embodiments, at least a portion of the cheating analysis data 252 may be generated by the local monitoring computers 212 and/or received from the user devices 204(1)-204(N). The cheating analysis data 252 and/or exam monitoring data 250 may be accessible via, for example, the cheating detection/prevention tool 254.

In one or more embodiments, the DBMS 248 and/or the DBMS 226 may be utilized by the local monitoring computer(s) 212 and/or the remote monitoring computer(s) 210 to access and/or retrieve data from the datastore(s) 208. At least a portion of the exam monitoring data 228, the cheating analysis data 230, the exam monitoring data 250, or the cheating analysis data 252 may be stored in the datastore(s) 208. Further, in various embodiments, the datastore(s) 208 may store historical data relating to one or more of the users 202(1)-202(N) such as, for example, data relating to performance on past examinations, identifying information, and so forth. The datastore(s) 208 may be any repository for storing data including one or more databases, one or more operational data stores, one or more schema-less data stores, one or more data files such as flat files, paper files, and so forth.

The cheating detection/prevention tool 254 may comprise computer-executable instructions configured to be executed by the processor(s) 236 to perform various monitoring and/or prevention operations. For example, the cheating detection/prevention tool 254 may be a software application that provides access via, for example, a web-based portal or some other communication interface, to the cheating analysis data 230 and/or the exam monitoring data 228 stored on the remote monitoring computer(s) 210. In one or more example embodiments, such as those in which at least one of the local monitoring computer(s) is a mobile tablet device or a smartphone, the cheating detection/prevention tool 254 may correspond to a dedicated user application running on such a device. The cheating detection/prevention tool 254 may be utilized, by a test administrator for example, to analyze exam monitoring data and/or cheating analysis data in real-time. The cheating detection/prevention tool 254 may also provide functionality that allows a test administrator to implement one or more preventive measures.

Although the components and functionality of the system architectures 100, 200 depicted in FIGS. 1 and 2 may have been described with respect to specific embodiments involving test takers taking an exam using user devices, this disclosure is not so limited. Embodiments of the disclosure relate to any scenario in which detection and/or prevention of the unauthorized exchange, transfer, or acquisition of information is desirable.

Illustrative Processes

Figure 3:
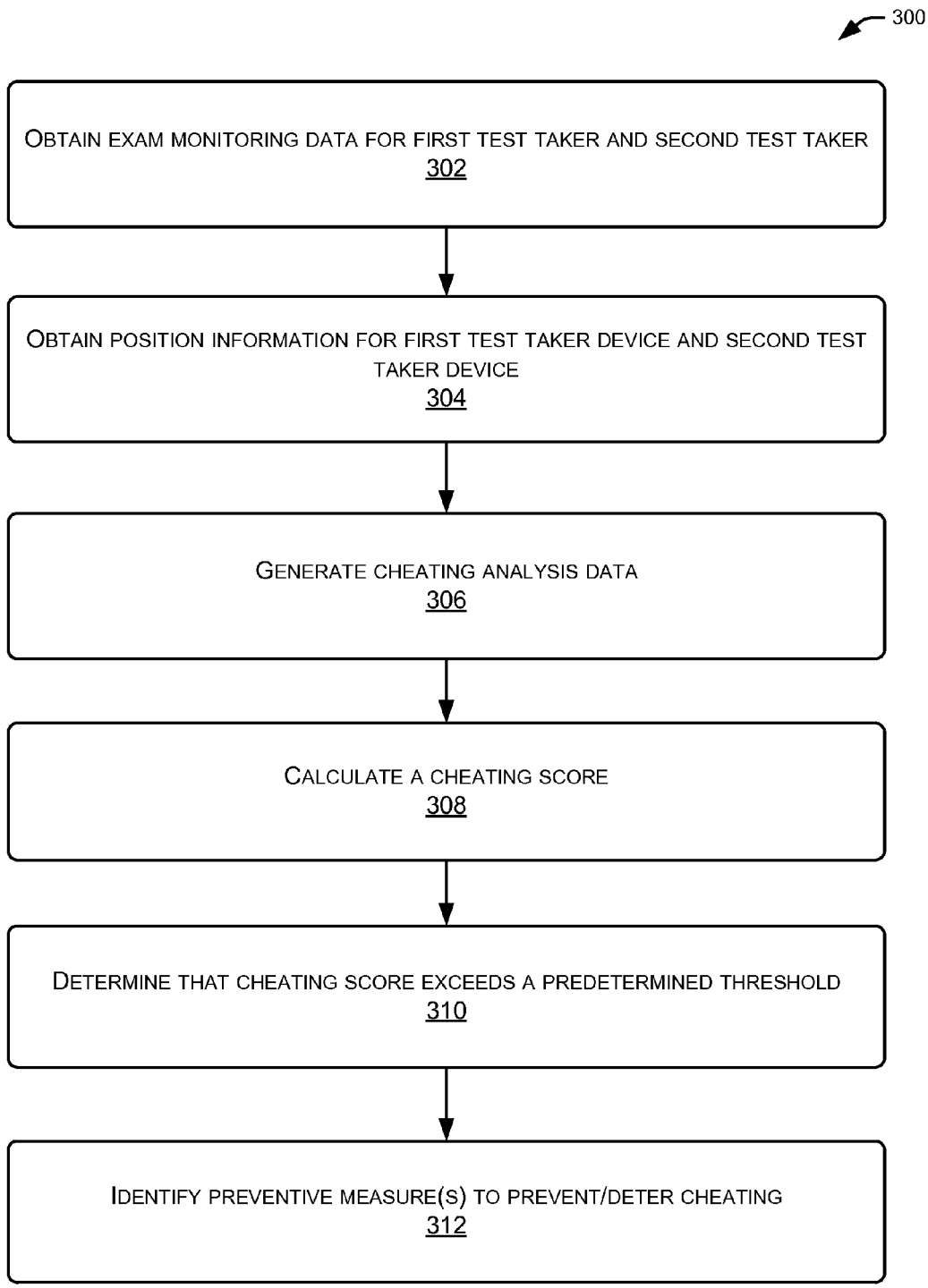
FIG. 3 depicts a process flow diagram of an illustrative method for detecting and deterring an unauthorized information exchange between users of user devices in accordance with an embodiment of the disclosure.

FIG. 3 depicts a process flow diagram illustrating an exemplary method 300 for detecting and/or preventing cheating by test takers taking a test using user devices. Although the method 300 is described in the context of cheating by test takers, one of ordinary skill in the art will appreciate that the method 300 is applicable to any scenario in which the detection and/or prevention of the unauthorized exchange, transfer, or acquisition of information is desirable.

At block 302, exam monitoring data for a first test taker and a second test taker is obtained. For the sake of convenience, the first test taker will be referred to as Jack and the second test taker will be referred to as Jill for further description of the process flow of FIG. 3. The exam monitoring data may include first exam monitoring data associated with a first set of inputs (e.g., responses) provided by Jack to his user device and second exam monitoring data associated with a second set of inputs (e.g., responses) provided by Jill to her user device.

At block 304, position information may be received for Jack's device and Jill's device by, for example, the remote monitoring computer(s) 210. The position information may indicate a proximity of Jack's device to Jill's device and/or a specific position of Jack's device in relation to Jill's device. For example, the position information may indicate that Jack's device is within 5 feet of Jill's device and/or that Jack's device is positioned immediately in front of Jill's device according to the seating arrangement of the test takers.

At block 306, cheating analysis data may be generated. The cheating analysis data may be generated based on an analysis of the exam monitoring data. The cheating analysis data may indicate various degrees of correspondence between the first monitoring data and the second monitoring data with respect to various factors that may be taken into account in assessing the potential that Jack and/or Jill are engaging in cheating.

At block 308, a cheating score (or other metric) may be calculated based at least in part on the cheating analysis data and/or the position information. A single cheating score may be calculated for both Jack and Jill that provides an indication of the likelihood that cheating is occurring that involves Jack and Jill without an indication of who may be culpable. Alternatively, separate cheating scores may be calculated for each of Jack and Jill, with each cheating score indicating an estimated likelihood that Jack or Jill may be cheating. For example, a higher cheating score may be calculated for Jack if Jack is seated behind Jill, most responses were received from Jill first, and so forth, despite a potential correspondence between exam monitoring data for Jack and Jill with respect to other factors.

Subsequent to the calculation of the cheating score(s), at block 310, a determination may be made that the calculated cheating score(s) exceeds an associated predetermined cheating threshold. As previously noted, the predetermined cheating threshold against which a particular cheating score is compared may vary based on historical data, position information, and so forth.

At block 312, one or more preventive measures may be identified. The preventive measures may include any of those previously described and may be automatically implemented, or provided to a test administrator, for example, who may be provided with the capability to selectively implement all, some, or none of the preventive measures.

Figure 4:
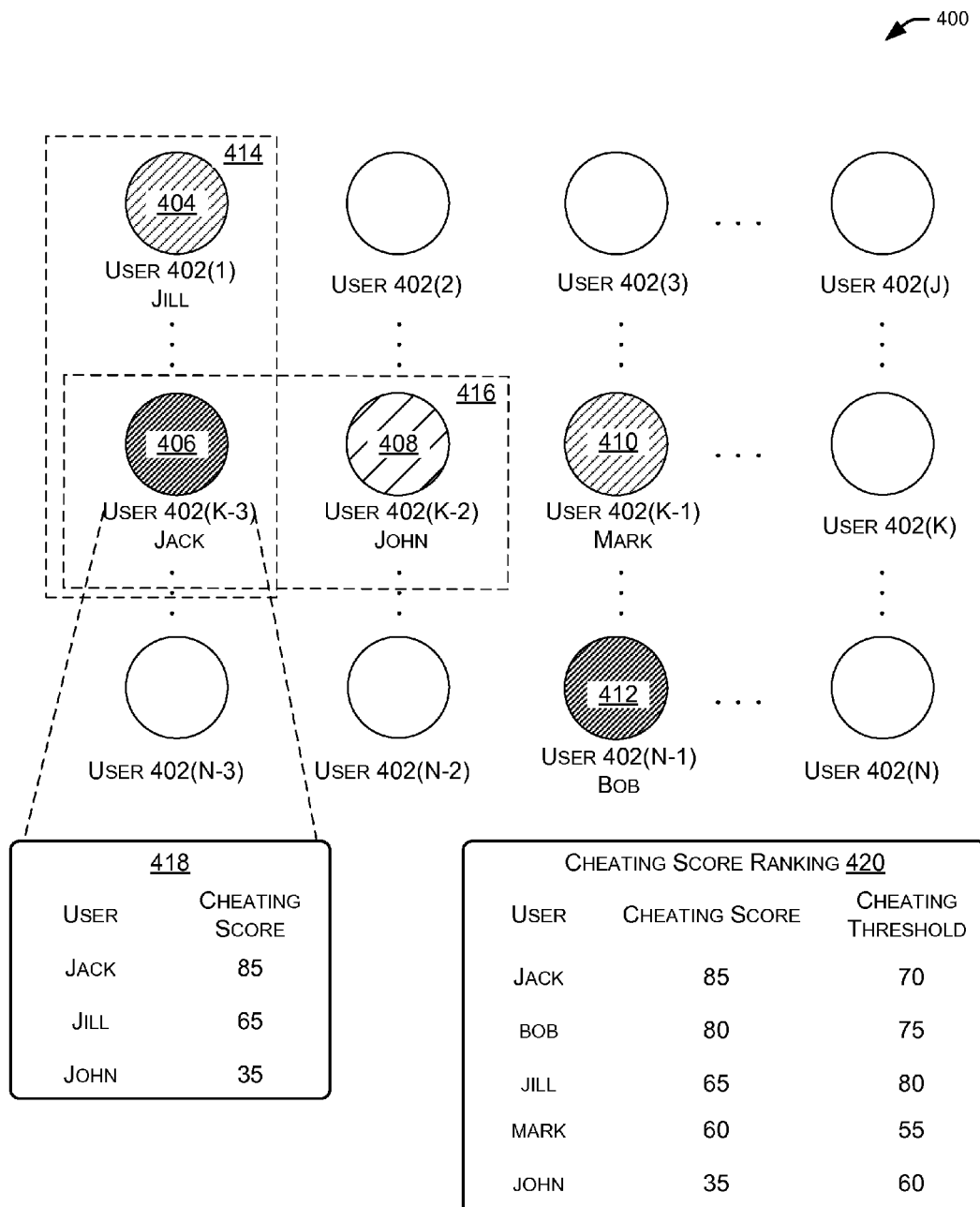
FIG. 4 depicts a schematic representation of various metrics relating to a potential unauthorized information exchange between users of user devices in accordance with one or more embodiments of the disclosure.

FIG. 4 depicts a schematic representation 400 of various metrics relating to a potential unauthorized information exchange between users of user devices. In one or more specific embodiments, FIG. 4 represents a high-level graphical representation of potential cheating occurring between various users along with cheating scores calculated for the various users based on cheating analysis data. The information conveyed in FIG. 4 may be presented, for example, to a test administrator in real-time during administration of a test.

FIG. 4 depicts graphical representations of various users 402(1)-402(N). The users 402(1)-402(N) may correspond, for example, to the users 102(1)-102(N) or the users 202(1)-202(N) respectively depicted in FIGS. 1 and 2. While the users 402(1)-402(N) are schematically depicted as being arranged in a grid-like pattern, any suitable arrangement is possible. Further, while the users are graphically represented in FIG. 4 using circles, it should be appreciated that any suitable representation of the users is possible, including any visual, audible, tactile, or other representation capable of identifying users and distinguishing one user from the next.

Information relating to cheating scores calculated for one or more users of the users 402(1)-402(N) may be provided. For example, one or more indicators may be displayed or otherwise presented that indicate a magnitude of a cheating score calculated for a particular user, and thus a likelihood that the user is engaging in cheating. For example, FIG. 4 depicts various degrees of shading of cheating score indicators 404, 406, 408, 410 and 412 that may correspond to different magnitudes of cheating scores associated with the respective users. While shading of different densities are used as indicators, the indicator(s) may include any type of visual indicator (e.g., a color spectrum indicating a range of cheating scores, varying a rate or degree of presentation of visual information to indicate relative cheating scores, numerical presentation of a particular user's cheating score by, for example, hovering a cursor device over the graphical representation of that user, etc.), an audible indicator, a tactile indicator, and so forth.

FIG. 4 depicts users 402(1), 402(K-3), 402(K-2), 402(K-1) and 402(N-1) which may represent users Jill, Jack, John, Mark and Bob, respectively. Cheating score indicators 404, 406, 408, 410 and 412 may be displayed or otherwise presented in association with the graphical representations of Jill, Jack, John, Mark and Bob, respectively. As previously noted, the cheating score indicators 404, 406, 408, 410 and 412 may indicate a relative magnitude of the respective cheating scores calculated for each of the corresponding users. For example, the cheating score indicator 406 for Jack as compared to the cheating score indicator 404 for Jill may indicate that Jack's cheating score is greater than Jill's cheating score. Similarly, the cheating score indicator 408 associated with John may indicate that John's cheating score is less than the respective cheating scores calculated for Jack and Jill. Similar representations for the cheating score indicators 404 and 410 may indicate that a cheating score calculated for Mark is the same or is close to a cheating score calculated for Jill. Further, similar representations for the cheating score indicators 406 and 412 may indicate that a cheating score calculated for Jack is the same or is close to a cheating score calculated for Bob. In certain embodiments, the cheating score indicators may allow a test administrator, for example, to quickly identify large deviations in cheating scores between users. Further, in certain embodiments, multiple cheating score indicators may be provided for each user. For example, small deviations in cheating scores that are not identifiable from one type of cheating score indicator may be identified from another type of cheating score indicator (e.g., numeric representations of the cheating scores).

Additional information may also be provided in the schematic representation 400. Various indicators may be provided that indicate various groupings of users that may be engaging in cheating. For example, indicator 414 may indicate that Jack and Jill may be involved in cheating. Similarly, indicator 416 may indicate that Jack and John may be involved in cheating. Additional information 418 may be presented in connection with a user that identifies other user(s) with whom the user may be engaged in cheating. The additional information 418 may be presented, for example, by moving a cursor device over the graphical representation of a user (e.g., Jack); however, any suitable mechanism for presenting such information is within the scope of this disclosure. The information 418 may in certain non-limiting embodiments indicate a cheating score calculated for particular user (e.g., John) and cheating scores calculated for other users with whom the particular user may be engaged in cheating (e.g., Jill, John).

As previously described, a higher cheating score calculated for Jack as compared to Jill and John may indicate that Jack is most likely to be cheating among the three. Further, in certain embodiments, a higher cheating score calculated for Jill as compared to John may indicate that Jill is more likely to be cheating herself or facilitating Jack's cheating than John. Behavioral information associated with Jill and John such as device rotation information may be assessed to gain further insight into whether Jill and/or John are facilitating Jack's cheating. In other embodiments, the cheating scores themselves may provide no indicator as to whether a user is facilitating another user's cheating, and other information (e.g., behavioral information) may alone provide greater insight.

The schematic representation 400 may further provide a cheating score ranking information 420 of cheating scores of users. Alternatively, any means for determining a distribution of cheating scores among users may be provided. The cheating score ranking information 420 may identify one or more users and respective corresponding cheating scores and cheating thresholds for each user. The information may allow a test administrator, for example, to quickly identify respective cheating scores for users and which users' cheating scores exceed corresponding cheating thresholds. A test administrator may utilize any of the information conveyed in the schematic representation 400 such as, for example, the cheating score indicators 404, 406, 408, 410, 412, the information 418, and/or the cheating score ranking information 420 to determine whether to initiate one or more preventive measures and/or whether to further investigate the potential for cheating.

Figure 5:
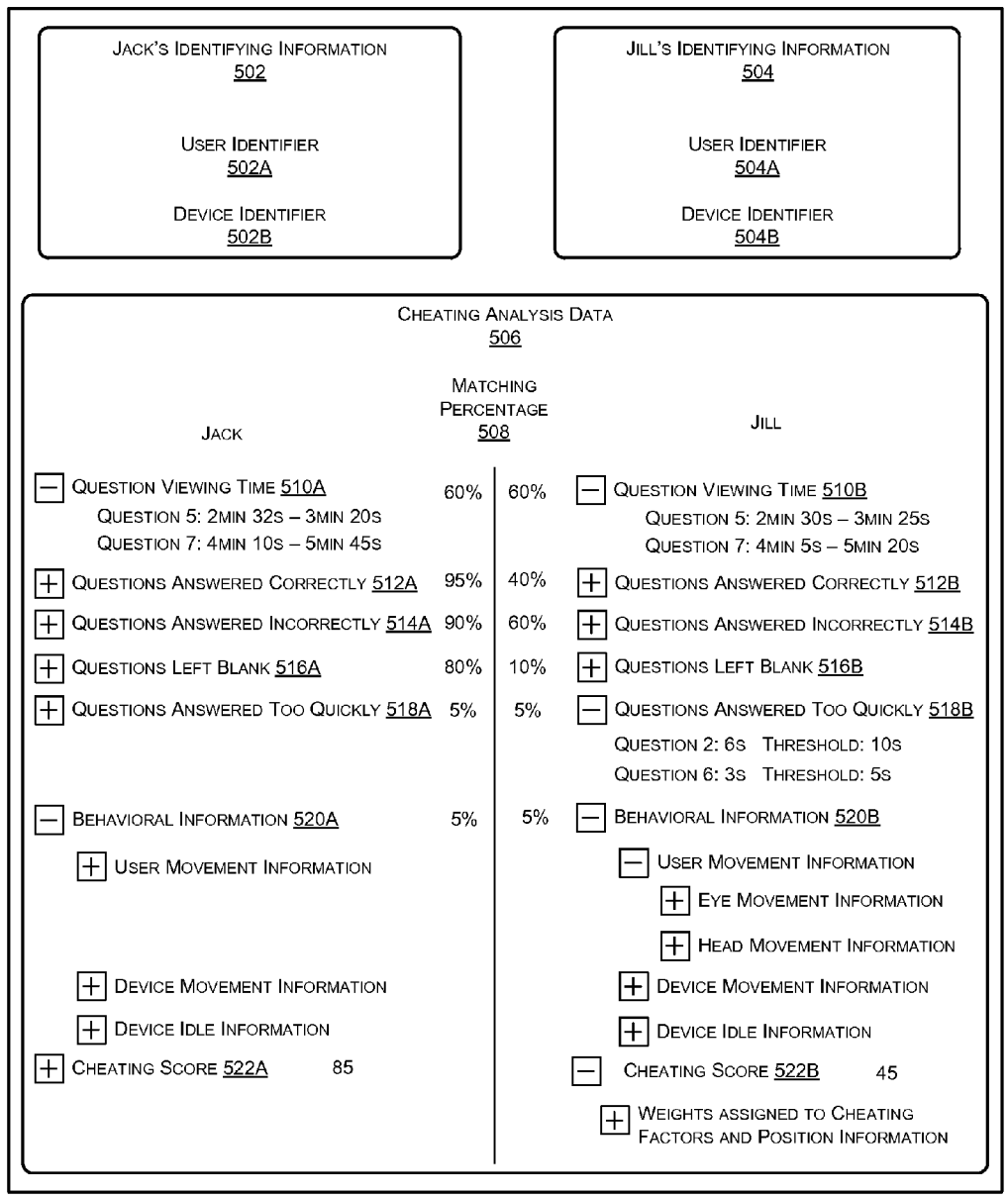
FIG. 5 depicts a schematic representation of an exemplary interface 500 for presenting cheating analysis data in accordance with one or more embodiments of the disclosure.

FIG. 5 depicts a schematic representation of an exemplary interface 500 for presenting cheating analysis data in accordance with one or more embodiments of the disclosure. For the sake of convenience, data relating to two users (Jack and Jill) is depicted. The information presented via the interface 500 includes identifying information 502 for Jack that includes a user identifier 502A associated with Jack and a device identifier 502B associated with a user device being used by Jack. Similarly, identifying information 504 for Jill is presented that includes a user identifier 504A associated with Jill and a device identifier 504B associated with the user device being used by Jill.

The information presented also includes cheating analysis data 506. The cheating analysis data 506 may include information obtained from exam monitoring data associated with Jack and Jill such as data generated based on an analysis of the exam monitoring data. The information may relate to various information indicators (also referred to herein as information categories or potential cheating indicators). For example, information related to question viewing time periods 510A, 510B; information related to questions answered correctly 512A, 512B; and information related to questions answered incorrectly 514A, 514B may be provided for Jack and Jill, respectively.

In addition, information related to questions for which no responses were received 516A, 516B, and information related to questions determined to have been answered in too short a timeframe 518A, 518B may be provided for Jack and Jill, respectively. Moreover, behavioral information 520A, 520B and cheating scores 522A, 522B may also be provided for Jack and Jill, respectively. The behavioral information 520A and/or the behavioral information 520B may include, for example, user movement information such as eye movement information, head movement information, and so forth. The behavioral information 520A and/or the behavioral information 520B may further include device movement information, device idle information, and so forth. As described earlier, eye movement information may, for example, include information relating to a frequency and/or duration of deviation(s) of a user's eyes from his/her respective user device. Similarly, head movement information may include information relating to a frequency and/or duration of deviation(s) of a user's head past, for example, a threshold angle with respect to a reference axis associated with the user's respective user device. In addition, as previously described, device movement information may include, for example, information relating to frequency and/or duration of movement(s) of a user's device past a static reference point, a frequency and/or duration of rotation(s) of a user's device past a threshold angle, and so forth. Device idle information may include, for example, a frequency and/or duration of time(s) a user's device was idle during a test. As used herein, the term "idle" may refer to absence of user interaction with the device.

Matching percentage(s) 508 may be provided for both Jack and Jill with respect to each of the information categories. Although matching percentages are shown for both Jack and Jill for each of the information categories, in various embodiments, a single respective matching percentage may be provided for both Jack and Jill for some or all of the information categories. Further, while matching percentages are shown, any suitable quantitative measure may be used.

In those embodiments, in which separate matching percentages are provided for Jack and Jill for each information category, the matching percentages may be the same for certain categories and may differ for others. For example, the matching percentages will typically be the same for Jack and Jill with respect to the question viewing time period category because this reflects the percentage of test time that Jack and Jill spent viewing the same questions during the same time periods.

In contrast, the matching percentage may differ for some of the other information categories depending on the particular manner in which the matching percentage is being determined. For example, with respect to the questions answered correctly category 512A, 512B, the matching percentage calculated for Jack may represent the number of same questions that Jack and Jill answered correctly as a percentage of the total number of questions answered correctly by Jack. The same may apply to the matching percentage calculated for Jill. As such, the matching percentages may differ for Jack and Jill. For example, assume Jack answered 60 of 100 questions on a test correctly and that Jill answered 80 of the 100 questions correctly. Now assume that Jack and Jill answered 40 of the same questions correctly. The matching percentage calculated for Jack for this information category may be 40/60×100=66.67%. The matching percentage calculated for Jill for this information category may be 40/80×100=50%.

The difference in the matching percentages stems from the fact that the same questions answered correctly by both Jack and Jill represent a larger percentage of the questions that Jack answered correctly as compared to the questions that Jill answered correctly. In some embodiments, a higher matching percentage for Jack for a particular information category may indicate a higher likelihood that Jack is cheating as compared to Jill, and may, as a result, lead to a higher cheating score for Jack.

The above discussion may also apply to other information categories as well such as the questions answered incorrectly category 514A, 514B, the questions left blank category (questions for which no responses were provided) 516A, 516B, and so forth. However, for any of these information categories, the matching percentages calculated for both Jack and Jill may be the same depending on the particular formula used to calculate the degree of correspondence.

Although each information category is shown in FIG. 5 as having a corresponding matching percentage associated therewith, in certain embodiments, matching percentages may not be provided for various categories. For example, the "questions answered too quickly" category 518A, 518B may not have matching percentages associated therewith in certain embodiments. For example, it may be determined that Jack provided responses to 7 questions out of a 100 question test in less than the predetermined response time thresholds for those questions. This data may not be compared to corresponding data associated with Jill, but may be applied as a factor in determining Jack's cheating score. As another example, the behavioral information 520A, 520B associated with Jack and Jill may, in certain embodiments, not have matching percentages associated therewith.

In various embodiments, one aspect of monitoring data associated with a particular test taker may be compared to a different aspect of monitoring data associated with another test taker. For example, the information relating to questions answered by Jack in less than the predetermined response time thresholds may be compared to behavioral information associated with Jill. More specifically, the specific time periods during which Jack answered the questions in too short a timeframe may be compared to behavioral data associated with Jill during the same or similar time periods. For example, device movement data associated with Jill's device may be analyzed to determine if Jill's device was rotated past a threshold angle of rotation during the same time periods that Jack answered the questions too quickly.

The foregoing are merely examples of the types of information categories and measures of correspondence between test taking characteristics that may be presented as the cheating analysis data 506 via the interface 500 and is by no means an exhaustive treatment.

The cheating analysis data 506 that is presented may also include an indication of a cheating score 522A for Jack and a cheating score 522B for Jill. Information regarding the weights assigned to various information categories (e.g., cheating factors) may also be provided. As previously noted, separate cheating scores 522A, 522B may be calculated for Jack and Jill respectively, or a single cheating score may be calculated for both.

Figure 6:
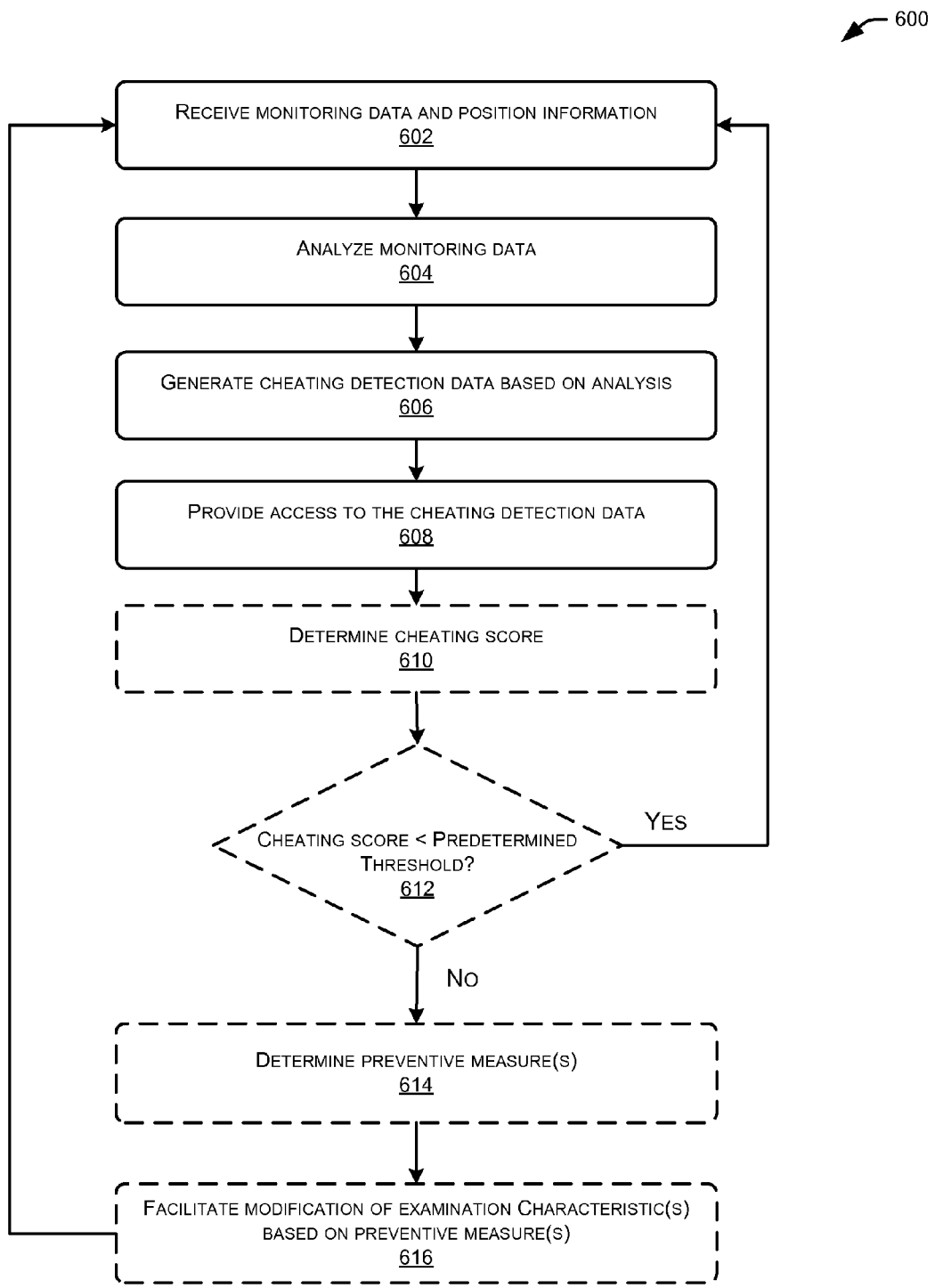
FIG. 6 depicts a process flow diagram of an illustrative method for detecting cheating and identifying preventive measures to deter the cheating in accordance with an embodiment of the disclosure.

FIG. 6 depicts a process flow diagram of an illustrative method 600 for gathering test taking data, determining a measure of a likelihood that cheating is occurring by test takers using user devices, and taking preventive measures to prevent or deter the cheating in accordance with one or more embodiments of the disclosure.

At block 602, test taking monitoring data and/or position information may be received. The test taking data may be associated with various inputs received by user devices from users. The test taking data may correspond to any of the monitoring data previously described.

At block 604, one or more characteristics of the test taking data may be analyzed. As previously discussed, the one or more characteristics may include one or more factors that may be relevant to detecting whether test takers may be cheating. In particular, various characteristics associated with test taking data associated with a first test taker may be compared to various corresponding characteristics associated with test taking data associated with a second test taker.

At block 606, cheating detection data may be generated based on the analysis at block 604. The cheating detection data may correspond to the cheating analysis data previously described. The cheating detection data may include information categories or any other indicators that may provide details regarding a degree of correspondence between test taking characteristics of different test takers or which may otherwise indicate a result of the analysis at block 604.

At block 608, access to the cheating detection data may be provided to, for example, a local monitoring system, or more particularly, a test administrator overseeing the administration of an examination being taken by test takers using the user devices.

In certain embodiments of the disclosure, the method 600 may end at block 608. The test administrator may, for example, assess the cheating detection data and utilize human judgment and knowledge available to him/her to determine whether the cheating detection data reveals potential cheating and whether preventive measures should be taken.

In other embodiments, the method 600 may continue through blocks 610-616. At optional block 610, a cheating score may be calculated based on the cheating detection data and/or the position information in accordance with any of the processes or methodologies previously described. At optional block 612, a determination may be made as to whether the calculated cheating score is less than or equal to a predetermined threshold (or equivalently whether the calculated cheating score is greater than the predetermined threshold). If it is determined that the cheating score does not exceed the predetermined threshold, then the process flow may, optionally, proceed again to block 602.

Alternatively, if it is determined, at block 612, that the cheating score is greater than the predetermined threshold, one or more preventive measures may be identified at optional block 614. Further, at optional block 616, modification of one or more examination characteristics may be facilitated based on the preventive measures. For example, in certain embodiments, the one or more preventive measures may be automatically implemented by, for example, remote monitoring computers 210. Alternatively, access to the one or more preventive measures may be provided in some form to, for example, the local monitoring computers 212, or more specifically, to a test administrator capable of interacting with the local monitoring computers 212. The test administrator may then make an independent judgment as to whether to proceed with implementation of one or more of the preventive measures.

Optionally, after modification of examination characteristics is facilitated at block 616, the process flow may continue once again to block 602. For example, another one or more iterations of the process flow may occur to permit modification of the preventive measures until the cheating score falls below the predetermined threshold.

Figure 7:
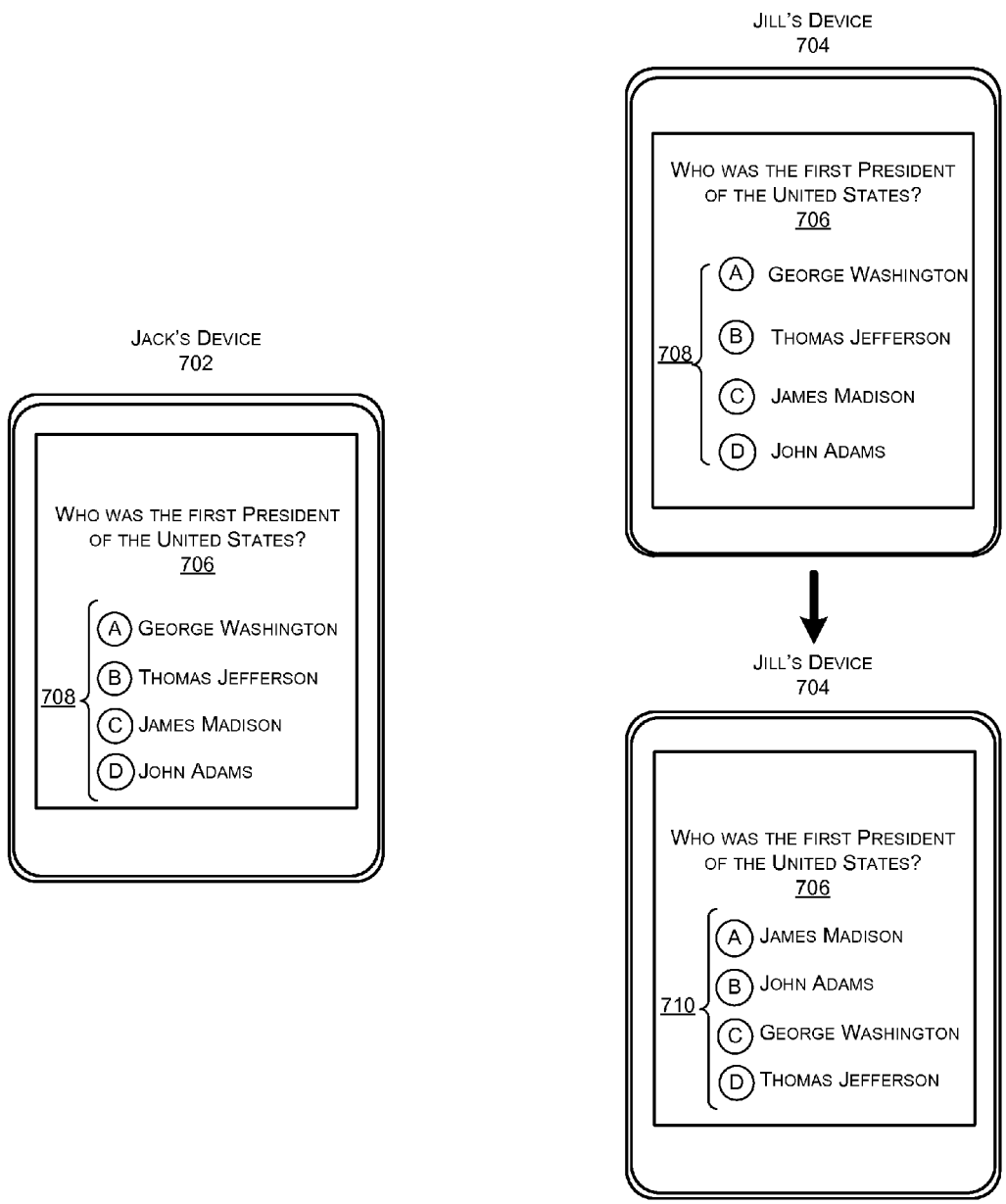
FIG. 7 depicts an exemplary preventive measure to deter cheating in which an order in which answer choices are presented is modified for a particular test taker in accordance with an embodiment of the disclosure.

FIG. 7 depicts an exemplary preventive measure to deter cheating in which an order in which answer choices are presented is modified for a particular test taker. FIG. 7 schematically depicts a first user device 702 (Jack's device) being used by a first test taker (Jack) and a second user device 704 (Jill's device) being used by a second test taker (Jill). A question 706 is presented to both Jack and Jill via their respective devices 702, 704. An order 708 of answer choices presented to Jack via Jack's device 702 may be modified to a different order 710 for presentation to Jill via Jill's device 704. Modifying the order in which answer choices are presented is an example of a preventive measure that may be used to deter cheating if cheating is suspected based on, for example, cheating score(s) calculated for Jack and/or Jill.

Figure 8:
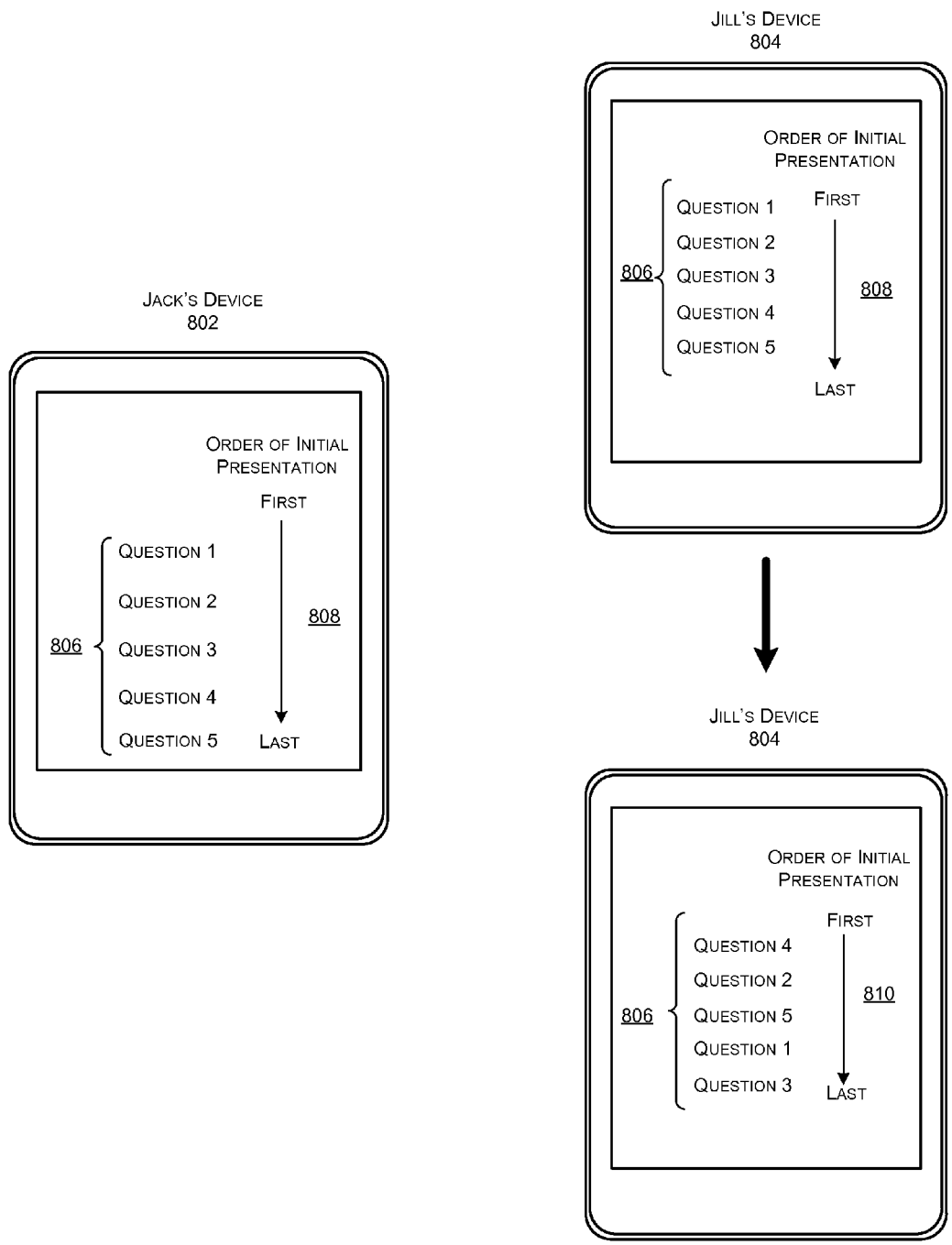
FIG. 8 depicts an exemplary preventive measure to deter cheating in which an order in which questions are presented is modified for a particular test taker in accordance with an embodiment of the disclosure.

FIG. 8 depicts another exemplary preventive measure to deter cheating in which an order in which questions are presented is modified for a particular test taker. A first user device 802 (Jack's device) being used by a first test taker (Jack) and a second user device 804 (Jill's device) being used by a second test taker (Jill) are schematically depicted. A set of questions 806 are presented to Jack via Jack's device 802 in a predetermined order 808. The same set of questions 806 may be presented to Jill via Jill's device 804 in a modified order 810. The order 810 for presentation to Jill may be randomly determined or may be deliberately chosen in a particular way so as to attempt to minimize the potential benefits from cheating. Further, the order 808 of presentation to Jack may also be randomly determined. Modifying the order in which questions are presented is an example of a preventive measure that may be used to deter cheating if cheating is suspected based on, for example, cheating score(s) calculated for Jack and/or Jill.

Figure 9:
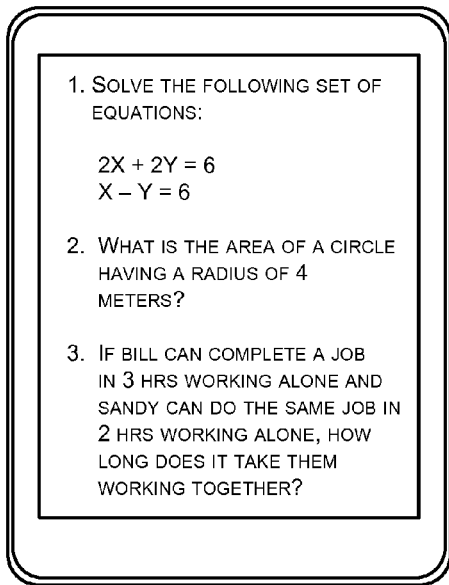
FIG. 9 depicts an exemplary preventive measure to deter cheating in which different sets of questions are chosen for different test takers in accordance with an embodiment of the disclosure.
Figure 9:
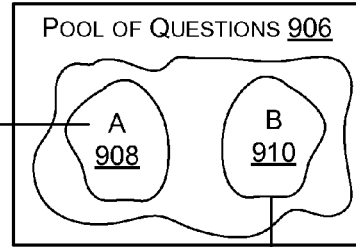
Figure 9:
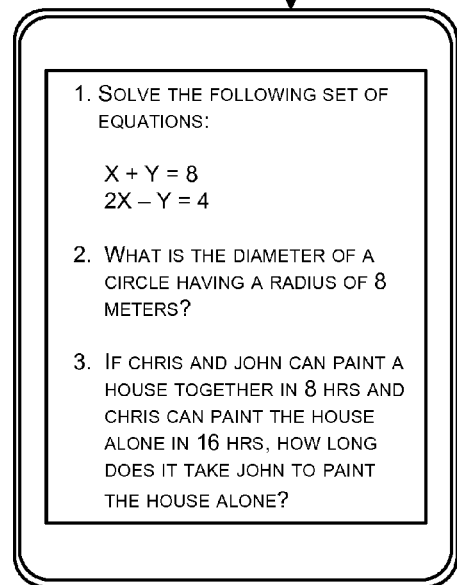

FIG. 9 depicts an exemplary preventive measure to deter cheating in which different sets of questions are chosen for different test takers. A first user device 902 (Jack's device) being used by a first test taker (Jack) and a second user device 904 (Jill's device) being used by a second test taker (Jill) are schematically depicted. A set of questions 908 and a different set of questions 910 may be chosen for presentation on Jack's device 902 and Jill's device 904, respectively. The set of questions 908 and the set of questions 910 may comprise different content. However, in various embodiments, the set of questions 908 and the set of questions 910 may be chosen such that the distribution of difficulty among the sets of questions is substantially the same. This may be done to eliminate introducing any testing bias by selecting different sets of questions. Choosing different sets of questions for presentation to different test takers is an example of a preventive measure that may be used to deter cheating if cheating is suspected based on, for example, cheating score(s) calculated for Jack and/or Jill.

The user devices 702, 802, 902 and 704, 804, 904 may represent the same or different devices. Further, the user devices may include any devices capable of receiving user input such as any of those previously described.

Although specific embodiments of the disclosure have been described, one of ordinary skill in the art will recognize that numerous other modifications and alternative embodiments are within the scope of the disclosure. For example, any of the functionality and/or process capabilities described with respect to a particular device or component may be performed by any other device or component. Further, although specific examples of detection data, information elements, metrics, relative position information, and so forth have been presented, it should be understood that numerous others are within the scope of this disclosure.

Additional types of computer storage media that may be present in the user devices 204(1)-204(N), the remote monitoring computers 210, and/or the local monitoring computers 212 may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the desired information and which can be accessed by the computing devices of FIG. 1. Combinations of any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

Embodiments may be provided as a computer program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks. For example, the distribution of software may be an Internet download.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A method, comprising:
   initiating, by one or more computer processors coupled to at least one memory, a first camera at a first user device;
   determining, by one or more computer processors and using the first camera, first behavioral data comprising a first duration of time that a first user's eyes deviated from the first user device;
   receiving first monitoring data associated with a first set of responses received by the first device from the first user in response to a set of questions, wherein the first monitoring data comprises at least:
      the first behavioral data; and
      a first viewing time period corresponding to a first length of time that a first question was viewed by the first user;
   receiving second monitoring data associated with a second set of responses received by a second device from a second user in response to the set of questions, wherein the second monitoring data comprises at least:
      second behavioral data comprising a second duration of time that the second user's eyes deviated from the second user device; and
      a second viewing time period corresponding to a second length of time that the first question was viewed by the second user;
   determining, by one or more computer processors, based on an analysis of the first monitoring data and the second monitoring data, a similarity metric indicative of a degree of correspondence between the first monitoring data and the second monitoring data; and
   generating, by one or more computer processors, a cheating metric based on the similarity metric, wherein the cheating metric indicates a probability that a portion of the first set or the second set of responses was obtained from an unauthorized source.

2. The method of claim 1, wherein each of the first monitoring data and the second monitoring data comprises respective data indicating a number or identity of questions for which corresponding correct responses or incorrect responses are received from the respective user.

3. The method of claim 2, wherein at least one of:
the first monitoring data comprises the identity of questions for which incorrect responses are included in the first set of responses and the second monitoring data comprises the identity of questions for which incorrect responses are included in the second set of responses, or
the first monitoring data comprises the identity of questions for which correct responses are included in the first set of responses and the second monitoring data comprises the identity of questions for which correct responses are included in the second set of responses.

4. The method of claim 1, wherein at least one of the first monitoring data or the second monitoring data comprises respective user device interaction data associated with one or more detected actions of the first user or the second user.

5. The method of claim 4, further comprising analyzing, by the one or more computers, at least one of: the respective user device interaction data of the first monitoring data or the respective user device interaction data of the second monitoring data to generate an analysis result, wherein the cheating metric is further determined based at least in part on the analysis result.

6. The method of claim 4, wherein the one or more detected actions comprise at least one of:
deviation of a line of sight associated with the first user or a line of sight associated with the second user from a respective reference point by more than a respective deviation threshold, or
rotation of the first device or rotation of the second device by more than a respective threshold angle from a respective reference axis.

7. The method of claim 1, further comprising:
obtaining, by the one or more computers, position information indicating a position of the first device relative to the second device.

8. The method of claim 7, further comprising:
generating, by the one or more computers, the cheating metric further based at least in part on the position information.

9. The method of claim 1, wherein the unauthorized source comprises at least one of: the second user, the second set of responses, or other information obtained by the first user in an unauthorized manner.

10. The method of claim 1, further comprising:
determining, by the one or more computers, that the cheating metric exceeds a threshold value; and
selecting, by the one or more computers, a first set of additional questions for presentation to the first user and a second set of additional questions for presentation to the second user in accordance with one or more preventive measures.

11. The method of claim 10, wherein the one or more preventive measures comprise at least one of:
randomizing an order in which the first set of additional questions are to be presented to the first user or an order that the second set of additional questions are to be presented to the second user,
randomizing, for at least one question common to the first set of additional questions and the second set of additional questions, an order in which a respective set of answer choices are to be presented to the first user or the second user, or
selecting a first question for inclusion in the first set of additional questions and a second question for inclusion in the second set of additional questions from different pools of questions, wherein respective difficulty levels associated with the first question and the second question are substantially the same.

12. The method of claim 10, further comprising:
providing, by the one or more computers, a third user device with access to at least one of: the cheating metric or the one or more preventive measures.

13. The method of claim 1, further comprising:
receiving, by the one or more computers, at least one of: first historical usage data associated with the first user or second historical usage data associated with the second user.

14. The method of claim 13, wherein the cheating metric is generated further based at least in part on at least one of: the first historical usage data or the second historical usage data.

15. A system comprising:
a first user device with a first camera;
a second user device with a second camera; and
one or more computers in communication with the first user device and the second user device, the one or more computers comprising:
at least one processor; and
at least one memory storing computer-executable instructions, wherein at least one processor of the one or more processors is configured to execute the computer-executable instructions to:
determine first behavioral information using the first camera, the first behavioral information comprising a first duration of time that a first user's eyes deviated from the first user device;
determine second behavioral information using the second camera, the second behavioral information comprising a second duration of time that a second user's eyes deviated from the second user device;
receive first monitoring data associated with first response information received by the first device from the first user, wherein the first monitoring data comprises the first behavioral information and a first viewing time period corresponding to a first length of time that a first question was viewed by the first user;
receive second monitoring data associated with second response information received by the second device from the second user, wherein the second monitoring data comprises the second behavioral information and a second viewing time period corresponding to a second length of time that the first question was viewed by the second user;
analyze the first monitoring data and the second monitoring data to identify one or more correlations; and
generate, based at least in part on the one or more correlations, a cheating metric indicating a probability that a portion of the first or the second response information was obtained from an unauthorized source.

16. The system of claim 15, wherein the at least one processor is further configured to execute the computer-executable instructions to:
determine that the cheating metric exceeds a threshold value; and
generate one or more preventive measures based on the determination that the cheating metric exceeds the threshold value, wherein the one or more preventive measures modify one or more characteristics associated with question information presented to the first user or one or more characteristics associated with question information presented to the second user.

17. The system of claim 15, wherein the cheating metric is a first cheating metric indicating a probability that the first response information was obtained from the first unauthorized source, and wherein the at least one processor is further configured to execute the computer-executable instructions to:

generate, based at least in part the one or more correlations, a second cheating metric indicating a probability that the second response information was obtained from the second unauthorized source; and generate one or more preventive measures based at least in part on a deviation between the first cheating metric and the second cheating metric, wherein the one or more preventive measures modify one or more characteristics associated with question information presented to the first user or one or more characteristics associated with question information presented to the second user.

18. The system of claim 17, wherein the at least one processor is further configured to execute the computer-executable instructions to:

implement the one or more preventative measures in real-time during administration of an examination with which the first response information and the second response information are associated.

19. The system of claim 15, wherein the at least one processor is further configured to execute the computer-executable instructions to determine the first length of time of the first viewing time period by:

receiving a first timestamp associated with initial presentation of the first question;

receiving a second timestamp associated with submission of a response to the first question; and determining a difference between the first timestamp and the second timestamp.

20. The system of claim 19, wherein the at least one processor is further configured to execute the computer-executable instructions to determine the first length of time of the first viewing time period by:

receiving a third timestamp associated with presentation of a second question;

determining that the first question is unanswered; and receiving a fourth timestamp associated with a second presentation of the first question.

* * * * *